(12) United States Patent
O'Sullivan et al.

(10) Patent No.: US 8,620,695 B2
(45) Date of Patent: Dec. 31, 2013

(54) INCREASING A POLICY VALUE ACCOUNT OF A LIFE INSURANCE POLICY BASED ON AN ECONOMIC VALUE OF THE POLICY

(71) Applicant: John Hancock Life Insurance Company (USA), Boston, MA (US)

(72) Inventors: Daragh O'Sullivan, Boston, MA (US); Ryan Charland, Hong Kong (CN)

(73) Assignee: John Hancock Life Insurance Company (USA), Boston, MA (US)

( * ) Notice: Subject to any disclaimer, the term of this patent is extended or adjusted under 35 U.S.C. 154(b) by 0 days.

(21) Appl. No.: 13/633,495

(22) Filed: Oct. 2, 2012

(65) Prior Publication Data

US 2013/0124230 A1   May 16, 2013

Related U.S. Application Data

(60) Provisional application No. 61/559,963, filed on Nov. 15, 2011, provisional application No. 61/561,229, filed on Nov. 17, 2011, provisional application No. 61/593,579, filed on Feb. 1, 2012.

(51) Int. Cl.
*G06Q 40/00* (2012.01)

(52) U.S. Cl.
USPC .................. 705/4; 705/35; 705/36 R; 705/38; 705/30; 705/2

(58) Field of Classification Search
USPC ........................ 705/4, 35–38, 30, 2
See application file for complete search history.

(56) References Cited

U.S. PATENT DOCUMENTS

| | | | |
|---|---|---|---|
| 6,999,935 B2 * | 2/2006 | Parankirinathan | 705/4 |
| 7,089,201 B1 * | 8/2006 | Dellinger et al. | 705/35 |
| 7,698,158 B1 * | 4/2010 | Flagg | 705/4 |
| 8,175,947 B2 * | 5/2012 | Michalowski et al. | 705/36 R |
| 2009/0198630 A1 * | 8/2009 | Treitler et al. | 705/36 R |
| 2009/0204442 A1 * | 8/2009 | Logsdon et al. | 705/4 |

* cited by examiner

*Primary Examiner* — Harish T. Dass
(74) *Attorney, Agent, or Firm* — Choate Hall & Stewart LLP; William R. Haulbrook

(57) ABSTRACT

The present disclosure describes, among other things, an example method for maintaining an account for a life insurance policy. The method may include determining an amount to apply to the account, the amount based at least in part on i) a plurality of first factors based on data for life insurance policies in a class of policies, wherein the class of policies includes the life insurance policy, and ii) a plurality of second factors based on data for an individual, wherein the individual is a policy holder of the life insurance policy. The method may include increasing at least a portion of the account by the amount.

20 Claims, 14 Drawing Sheets

POLICY CREDIT MEASURE ADJUSTMENT FACTORS

The Policy Credit Measure Adjustment Factors are used to calculate the Policy Credit Measure Adjustment on each Processing Date. The rates for the Age of the Life Insured are shown below.

| Age | Policy Credit Measure Adjustment Factor A | Policy Credit Measure Adjustment Factor B | Age | Policy Credit Measure Adjustment Factor A | Policy Credit Measure Adjustment Factor B |
|---|---|---|---|---|---|
| 35 | 2.820432 | 0.016030 | 79 | 1.188093 | -0.290139 |
| 36 | 2.558613 | 0.004074 | 80 | 1.594310 | -0.306944 |
| 37 | 2.192269 | 0.003431 | 81 | 1.130771 | -0.314371 |
| 38 | 2.192269 | 0.003498 | 82 | 1.102112 | -0.302597 |
| 39 | 2.192269 | 0.003745 | 83 | 1.073455 | -0.263503 |
| 40 | 2.192269 | 0.004858 | 84 | 1.044800 | -0.196363 |
| 41 | 2.192269 | 0.004650 | 85 | 1.016146 | -0.089515 |
| 42 | 2.192269 | 0.004444 | 86 | 0.987494 | 0.045063 |
| 43 | 2.192269 | 0.003559 | 87 | 0.958843 | 0.214162 |
| 44 | 2.192269 | 0.003102 | 88 | 0.930195 | 0.426257 |
| 45 | 2.163576 | 0.001782 | 89 | 0.901547 | 0.719912 |
| 46 | 2.134859 | 0.000854 | 90 | 0.872902 | 0.889574 |
| 47 | 2.106142 | -0.001845 | 91 | 0.844258 | 1.166344 |
| 48 | 2.077427 | -0.006308 | 92 | 0.815616 | 1.439081 |
| 49 | 2.048714 | -0.009633 | 93 | 0.786975 | 1.751777 |
| 50 | 2.020004 | -0.011340 | 94 | 0.758336 | 2.122620 |
| 51 | 1.991294 | -0.011798 | 95 | 0.729699 | 2.557039 |
| 52 | 1.962586 | -0.013380 | 96 | 0.729699 | 3.022462 |
| 53 | 1.933880 | -0.014980 | 97 | 0.729699 | 3.515422 |
| 54 | 1.905175 | -0.017698 | 98 | 0.729699 | 4.079906 |
| 55 | 1.876472 | -0.021085 | 99 | 0.729699 | 4.718054 |
| 56 | 1.847771 | -0.024470 | 100 | 0.729699 | 5.355886 |
| 57 | 1.819071 | -0.028955 | 101 | 0.729699 | 5.952293 |
| 58 | 1.790373 | -0.032725 | 102 | 0.729699 | 6.543244 |
| 59 | 1.761677 | -0.038066 | 103 | 0.729699 | 7.128715 |
| 60 | 1.732982 | -0.043899 | 104 | 0.729699 | 7.709604 |
| 61 | 1.704288 | -0.050892 | 105 | 0.729699 | 8.231118 |
| 62 | 1.675597 | -0.058216 | 106 | 0.729699 | 8.433586 |
| 63 | 1.646907 | -0.065864 | 107 | 0.729699 | 8.757075 |
| 64 | 1.618219 | -0.073380 | 108 | 0.729699 | 9.022603 |
| 65 | 1.589533 | -0.081834 | 109 | 0.729699 | 9.227658 |
| 66 | 1.560848 | -0.092294 | 110 | 0.729699 | 9.263038 |
| 67 | 1.532164 | -0.103646 | 111 | 0.729699 | 8.549371 |
| 68 | 1.503483 | -0.116085 | 112 | 0.729699 | 7.794516 |
| 69 | 1.474803 | -0.130022 | 113 | 0.729699 | 6.995942 |
| 70 | 1.446124 | -0.145000 | 114 | 0.729699 | 6.151896 |
| 71 | 1.417447 | -0.159902 | 115 | 0.729699 | 5.259284 |
| 72 | 1.388773 | -0.173835 | 116 | 0.729699 | 4.317001 |
| 73 | 1.360099 | -0.188269 | 117 | 0.729699 | 3.323371 |
| 74 | 1.331427 | -0.202413 | 118 | 0.729699 | 2.279757 |
| 75 | 1.302757 | -0.220565 | 119 | 0.729699 | 1.196485 |
| 76 | 1.274089 | -0.236502 | 120 | 0.729699 | 0.184644 |
| 77 | 1.245421 | -0.253955 | 121 | 0.000000 | 0.000000 |
| 78 | 1.216757 | -0.272115 | | | |

FIG. 8

MAXIMUM MONTHLY POLICY CREDIT MEASURE COST OF INSURANCE RATES

The rate per dollar equals the rate shown below divided by 1000. The Maximum Monthly Policy Credit Measure Cost of Insurance Rates will be increased for any Additional Rating applied to the Cost of Insurance Rates.

| Age | Maximum Monthly Policy Credit Measure Cost of Insurance Rates per $1,000 of Policy Credit Measure Net Amount at Risk | Age | Maximum Monthly Policy Credit Measure Cost of Insurance Rates per $1,000 of Policy Credit Measure Net Amount at Risk | Age | Maximum Monthly Policy Credit Measure Cost of Insurance Rates per $1,000 of Policy Credit Measure Net Amount at Risk |
|---|---|---|---|---|---|
| 35 | 0.05686 | 66 | 1.14288 | 97 | 23.56624 |
| 36 | 0.09580 | 67 | 1.24864 | 98 | 25.33808 |
| 37 | 0.10000 | 68 | 1.36264 | 99 | 27.27960 |
| 38 | 0.10750 | 69 | 1.48096 | 100 | 29.41704 |
| 39 | 0.11420 | 70 | 1.64264 | 101 | 31.16104 |
| 40 | 0.09736 | 71 | 1.78576 | 102 | 33.06824 |
| 41 | 0.10536 | 72 | 1.99784 | 103 | 35.15696 |
| 42 | 0.11536 | 73 | 2.22224 | 104 | 37.45024 |
| 43 | 0.12672 | 74 | 2.45912 | 105 | 39.94024 |
| 44 | 0.14008 | 75 | 2.71888 | 106 | 42.69000 |
| 45 | 0.15544 | 76 | 3.00320 | 107 | 45.73872 |
| 46 | 0.17016 | 77 | 3.33472 | 108 | 49.13520 |
| 47 | 0.18616 | 78 | 3.72384 | 109 | 52.93856 |
| 48 | 0.19552 | 79 | 4.17576 | 110 | 57.22344 |
| 49 | 0.20624 | 80 | 4.67176 | 111 | 62.09336 |
| 50 | 0.22160 | 81 | 5.24072 | 112 | 66.66664 |
| 51 | 0.23968 | 82 | 5.83800 | 113 | 66.66664 |
| 52 | 0.26448 | 83 | 6.48768 | 114 | 66.66664 |
| 53 | 0.29120 | 84 | 7.21384 | 115 | 66.66664 |
| 54 | 0.32536 | 85 | 8.03384 | 116 | 66.66664 |
| 55 | 0.36752 | 86 | 8.95376 | 117 | 66.66664 |
| 56 | 0.41048 | 87 | 9.97200 | 118 | 66.66664 |
| 57 | 0.45672 | 88 | 11.07944 | 119 | 66.66664 |
| 58 | 0.49632 | 89 | 12.26672 | 120 | 66.66664 |
| 59 | 0.54200 | 90 | 13.52704 | 121 | 0 |
| 60 | 0.59704 | 91 | 14.73304 | | |
| 61 | 0.66432 | 92 | 16.12160 | | |
| 62 | 0.74648 | 93 | 17.38688 | | |
| 63 | 0.83880 | 94 | 18.86832 | | |
| 64 | 0.93592 | 95 | 20.45840 | | |
| 65 | 1.03864 | 96 | 21.94544 | | |

FIG. 9

| Surrender Change Period (Policy Year) | Maximum Percentage of Surrender Charge | Surrender Charge Period (Policy Year) | Maximum Percentage of Surrender Charge |
|---|---|---|---|
| 1 | 100% | 12 | 45% |
| 2 | 95% | 13 | 40% |
| 3 | 90% | 14 | 35% |
| 4 | 85% | 15 | 30% |
| 5 | 80% | 16 | 25% |
| 6 | 75% | 17 | 20% |
| 7 | 70% | 18 | 15% |
| 8 | 65% | 19 | 10% |
| 9 | 60% | 20 | 5% |
| 10 | 55% | 21+ | 0% |
| 11 | 50% | | |

FIG. 10

POLICY CREDIT MEASURE ADJUSTMENT FACTORS (continued)

The Policy Credit Measure Adjustment Factors are used to calculate the Policy Credit Measure Adjustment on each Processing Date. The rates for the Age of the Life Insured are shown below.

| Age | Policy Credit Measure Adjustment Factor C | Policy Credit Measure Adjustment Factor D | Age | Policy Credit Measure Adjustment Factor C | Policy Credit Measure Adjustment Factor D |
|---|---|---|---|---|---|
| 35 | -0.963750 | 0.003315 | 79 | 0 | 0.419223 |
| 36 | -0.963750 | 0.004958 | 80 | 0 | 0.436002 |
| 37 | -0.963750 | 0.006518 | 81 | 0 | 0.452661 |
| 38 | -0.963750 | 0.008017 | 82 | 0 | 0.469152 |
| 39 | -0.963750 | 0.009512 | 83 | 0 | 0.485421 |
| 40 | -0.963750 | 0.011240 | 84 | 0 | 0.501352 |
| 41 | -0.963750 | 0.015352 | 85 | 0 | 0.516835 |
| 42 | -0.963750 | 0.019746 | 86 | 0 | 0.531795 |
| 43 | -0.963750 | 0.024352 | 87 | 0 | 0.546169 |
| 44 | -0.963750 | 0.029182 | 88 | 0 | 0.559912 |
| 45 | 0 | 0.034486 | 89 | 0 | 0.573041 |
| 46 | 0 | 0.040051 | 90 | 0 | 0.584484 |
| 47 | 0 | 0.045887 | 91 | 0 | 0.595186 |
| 48 | 0 | 0.052001 | 92 | 0 | 0.605155 |
| 49 | 0 | 0.058394 | 93 | 0 | 0.614409 |
| 50 | 0 | 0.065036 | 94 | 0 | 0.622988 |
| 51 | 0 | 0.071952 | 95 | 0 | 0.630944 |
| 52 | 0 | 0.079155 | 96 | 0 | 0.638446 |
| 53 | 0 | 0.086651 | 97 | 0 | 0.645565 |
| 54 | 0 | 0.094459 | 98 | 0 | 0.652444 |
| 55 | 0 | 0.102626 | 99 | 0 | 0.659294 |
| 56 | 0 | 0.111174 | 100 | 0 | 0.666298 |
| 57 | 0 | 0.120127 | 101 | 0 | 0.673645 |
| 58 | 0 | 0.129487 | 102 | 0 | 0.681676 |
| 59 | 0 | 0.139262 | 103 | 0 | 0.690915 |
| 60 | 0 | 0.149450 | 104 | 0 | 0.702193 |
| 61 | 0 | 0.160043 | 105 | 0 | 0.716713 |
| 62 | 0 | 0.171035 | 106 | 0 | 0.727170 |
| 63 | 0 | 0.182437 | 107 | 0 | 0.739931 |
| 64 | 0 | 0.194249 | 108 | 0 | 0.756364 |
| 65 | 0 | 0.206279 | 109 | 0 | 0.778801 |
| 66 | 0 | 0.219137 | 110 | 0 | 0.810832 |
| 67 | 0 | 0.232217 | 111 | 0 | 0.855703 |
| 68 | 0 | 0.245718 | 112 | 0 | 0.921508 |
| 69 | 0 | 0.259637 | 113 | 0 | 1.013430 |
| 70 | 0 | 0.273974 | 114 | 0 | 1.087872 |
| 71 | 0 | 0.288734 | 115 | 0 | 1.167129 |
| 72 | 0 | 0.303929 | 116 | 0 | 1.251515 |
| 73 | 0 | 0.319566 | 117 | 0 | 1.341359 |
| 74 | 0 | 0.335638 | 118 | 0 | 1.437017 |
| 75 | 0 | 0.352100 | 119 | 0 | 1.538863 |
| 76 | 0 | 3.687640 | 120 | 0 | 1.647297 |
| 77 | 0 | 0.385546 | 121 | 0 | 0 |
| 78 | 0 | 0.402385 | | | |

FIG. 11

| Age | Minimum Death Benefit Factor A | Minimum Death Benefit Factor B | Age | Minimum Death Benefit Factor A | Minimum Death Benefit Factor B |
|---|---|---|---|---|---|
| 35 | 11.7527 | 5.3395 | 79 | 3.0592 | 1.4080 |
| 36 | 11.2851 | 5.1273 | 80 | 2.9952 | 1.3808 |
| 37 | 10.8747 | 4.9411 | 81 | 2.9343 | 1.3552 |
| 38 | 10.5420 | 4.7730 | 82 | 2.8763 | 1.3314 |
| 39 | 10.1478 | 4.6113 | 83 | 2.8206 | 1.3092 |
| 40 | 9.8041 | 4.4554 | 84 | 2.7667 | 1.2884 |
| 41 | 9.4638 | 4.3010 | 85 | 2.7143 | 1.2689 |
| 42 | 9.1364 | 4.1524 | 86 | 2.6630 | 1.2510 |
| 43 | 9.8220 | 4.0098 | 87 | 2.1230 | 1.2346 |
| 44 | 8.5201 | 3.8728 | 88 | 2.5613 | 1.2197 |
| 45 | 8.2306 | 3.7414 | 89 | 2.5091 | 1.2063 |
| 46 | 7.9530 | 3.6155 | 90 | 2.4541 | 1.1946 |
| 47 | 7.6865 | 3.4946 | 91 | 2.3944 | 1.1844 |
| 48 | 7.4305 | 3.3785 | 92 | 2.3275 | 1.1755 |
| 49 | 7.1831 | 3.2662 | 93 | 2.2496 | 1.1677 |
| 50 | 6.9440 | 3.1578 | 94 | 2.1536 | 1.1590 |
| 51 | 6.7138 | 3.0534 | 95 | 2.0339 | 1.1486 |
| 52 | 6.4922 | 2.9528 | 96 | 1.8851 | 1.1352 |
| 53 | 6.7138 | 2.8564 | 97 | 1.7041 | 1.1167 |
| 54 | 6.4922 | 2.7640 | 98 | 1.4913 | 1.0908 |
| 55 | 6.2796 | 2.6755 | 99 | 1.2523 | 1.0536 |
| 56 | 6.0757 | 2.5912 | 100 | 1 | 1 |
| 57 | 5.8806 | 2.5106 | 101 | 1 | 1 |
| 58 | 5.6945 | 2.4335 | 102 | 1 | 1 |
| 59 | 5.5165 | 2.3594 | 103 | 1 | 1 |
| 60 | 5.3464 | 2.2882 | 104 | 1 | 1 |
| 61 | 5.1828 | 2.2200 | 105 | 1 | 1 |
| 62 | 5.0255 | 2.1549 | 106 | 1 | 1 |
| 63 | 4.8748 | 2.0929 | 107 | 1 | 1 |
| 64 | 4.7308 | 2.0340 | 108 | 1 | 1 |
| 65 | 4.5937 | 1.9779 | 109 | 1 | 1 |
| 66 | 4.4632 | 1.9245 | 110 | 1 | 1 |
| 67 | 4.3390 | 1.8733 | 111 | 1 | 1 |
| 68 | 4.2204 | 1.8243 | 112 | 1 | 1 |
| 69 | 4.1068 | 1.7772 | 113 | 1 | 1 |
| 70 | 3.9977 | 1.7318 | 114 | 1 | 1 |
| 71 | 3.8929 | 1.6883 | 115 | 1 | 1 |
| 72 | 3.7918 | 1.6467 | 116 | 1 | 1 |
| 73 | 3.6948 | 1.6073 | 117 | 1 | 1 |
| 74 | 3.6017 | 1.5698 | 118 | 1 | 1 |
| 75 | 3.3484 | 1.5342 | 119 | 1 | 1 |
| 76 | 3.2712 | 1.5002 | 120 | 1 | 1 |
| 77 | 3.1973 | 1.4678 | 121 | 1 | 1 |
| 78 | 3.1266 | 1.4370 | | | |

FIG. 12

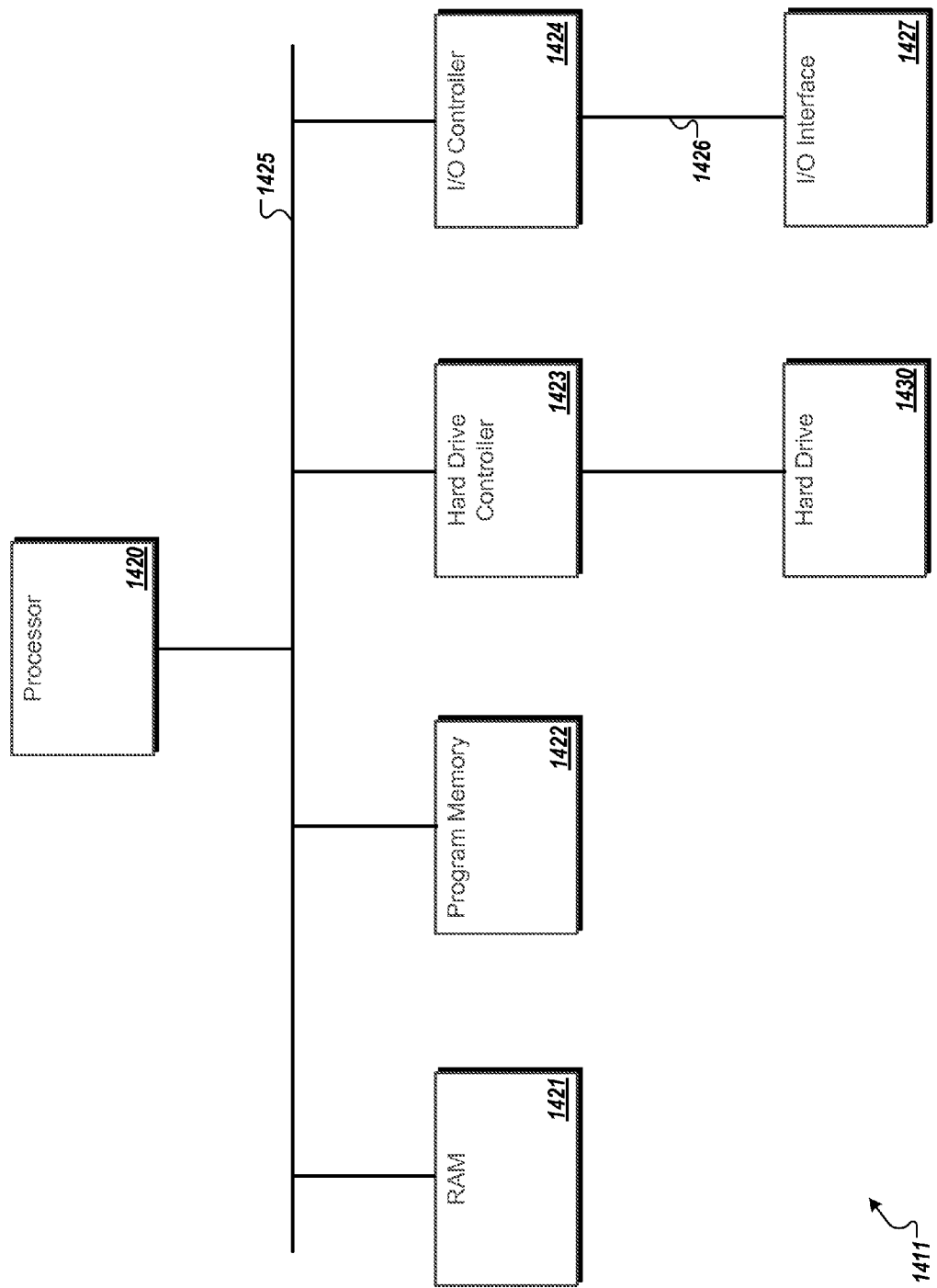

INCREASING A POLICY VALUE ACCOUNT OF A LIFE INSURANCE POLICY BASED ON AN ECONOMIC VALUE OF THE POLICY

RELATED APPLICATIONS

This application claims priority to U.S. Application No. 61/559,963, entitled "Increasing an Account Value of a Life Insurance Policy Based on an Economic Value of the Policy" and filed Nov. 15, 2011, the contents of which are hereby incorporated by reference in their entirety.

This application claims priority to U.S. Application No. 61/561,229, entitled "Increasing an Account Value of a Life Insurance Policy Based on an Economic Value of the Policy" and filed Nov. 17, 2011, the contents of which are hereby incorporated by reference in their entirety.

This application claims priority to U.S. Application No. 61/593,579, entitled "Increasing an Account Value of a Life Insurance Policy Based on an Economic Value of the Policy" and filed Feb. 1, 2012, the contents of which are hereby incorporated by reference in their entirety.

BACKGROUND

Insurance is used to protect businesses and individuals from certain risks. Insurance enables businesses and individuals to shift their risk of loss to an insurance company in exchange for payment of insurance premiums. For example, life insurance provides an individual's designated beneficiary a benefit upon the death of the individual in exchange for premium payments by the individual during his life.

Life insurance policies are typically either protection policies or investment policies. Protection policies are designed to provide a benefit to the designated beneficiary upon the occurrence of a specified event, e.g. the death of the individual policy holder, in exchange for premium payments. Insurance companies may invest the premiums and thus increase or decrease the value of the collected premiums.

Investment policies provide an investment vehicle for the growth of the individual's premium payments while still providing the option of having a benefit paid to the designated beneficiary at the time of the individual's death. Types of life insurance investment policies include whole life, universal life, and variable life policies.

Whole life insurance policies may contain two components: a term portion which pays a face amount of the policy to the designated beneficiary upon the individual's death and an investment portion which builds a cash value that the individual can borrow against during their lifetime. The cash value may be accessed at any time through policy loans. The premium payment for a whole life insurance policy may be based on the cost of the term portion and the cost of the investment portion.

Variable life policies may permit an individual to invest a portion of their premium payments in securities, e.g. stocks and bonds. The benefit provided to the designated beneficiary upon the individual's death and the cash value of the policy may depend on the performance of the variable life investments.

Universal life insurance policies may provide payment of a face amount of the policy to a designated beneficiary upon the individual's death in exchange for premium payments during the life of the individual. Universal life insurance policies may include a cash value portion that is funded by the amount by which the premium payments exceed the current cost of insurance.

Typically, a policy value account is created when an insurance company issues a new policy. The policy value account represents the cash value portion of the policy. As described above, the policy value account may be invested by the insurance company or by the individual policy holder.

Since a life insurance company may aggregate premiums for investment, the effects of the policy holders' patterns of paying premiums may be shared among all of the policies with respect to which premiums have been paid, benefitting some policy holders while not benefitting others. New methods are needed for managing policy value accounts.

SUMMARY

Presented herein, in certain embodiments, are systems and methods for managing a policy value account of a life insurance policy such that the account may vary based on an economic value of the policy. For example, a life insurance company may create and/or maintain a notional index corresponding to an economic value of the life insurance policy, wherein the notional index is updated during the term of the life insurance policy. The value of the account may be updated as a function of the notional index, as well as other factors.

In some aspects, the present disclosure describes a method. The method may include maintaining a policy value account for a life insurance policy. The method may include determining, by a processor executing on a server, an amount to apply to the policy value account, the amount based at least in part on i) a plurality of first factors based on data for life insurance policies in a class of policies, wherein the class of policies comprises the life insurance policy, and ii) a plurality of second factors based on data for an individual, wherein the individual is a policy holder of the life insurance policy. The method may include increasing, by the processor, at least a portion of the policy value account by the amount.

The plurality of first factors may include a plurality of product factors and a plurality of experience factors. Determining the amount may include determining the amount based at least in part on an economic value of the life insurance policy. Determining the amount may include adjusting a product factor of the plurality of product factors based on at least one experience factor of the plurality of experience factors. Determining the amount may include adjusting an experience factor of the plurality of experience factors based on at least one action of the plurality of actions of the holder. Determining the amount may include adjusting an experience factor of the plurality of experience factors based on a projected value for the experience factor. Determining the amount may include determining the amount months after issuance of the life insurance policy. Determining the amount may include determining the amount each month, each day, or each year. Determining the amount may include determining the amount on an irregular basis. Determining the amount may include determining that the amount falls below a threshold, and substituting the threshold for the amount.

Increasing the policy value account may include adding the amount to the policy value account for a universal life insurance policy. Increasing the policy value account may include adding the amount to the policy value account for a variable life insurance policy. Increasing the policy value account may include adding the amount a period of time after issuance of the life insurance policy.

In some aspects, the present disclosure describes a method. The method may include maintaining a policy value account for a life insurance policy. The method may include updating, by a processor executing on a server, a notional index corresponding to an economic value of the life insurance policy, wherein the notional index has been updated since issuance of the life insurance policy. The method may include determining, by the processor, an amount to apply to the policy value account based at least in part on the notional index and the policy value account. The method may include increasing, by the processor, at least a portion of the policy value account by the amount.

The notional index may have been periodically updated since issuance of the life insurance policy. Determining the amount may include determining the amount based at least in part on the policy value account. Determining the amount may include determining the amount based at least in part on a difference between the notional index and the policy value account.

In some aspects, the present disclosure describes a method. The method may include maintaining a policy value account for a life insurance policy. The method may include updating, by a processor executing on a server, a first index, wherein the first index is based at least in part on a) a plurality of first factors based on data for life insurance policies in a class of policies, wherein the class of policies comprises the life insurance policy, and b) a plurality of second factors based on data for an individual, wherein the individual is a policy holder of the life insurance policy. The method may include updating, by the processor executing on a server, a second index, wherein the second index is based at least in part on a plurality of third factors. The method may include determining, by the processor, an amount to apply to the policy value account based on the first index and the second index. The method may include increasing, by the processor, at least a portion of the policy value account by the amount.

The plurality of third factors may be equal to a subset of the plurality of second factors. The plurality of third factors may not be equal to the plurality of first factors. The plurality of third factors may not be equal to the plurality of second factors.

In some aspects, the present disclosure describes a method. The method may include maintaining a policy value account for a life insurance policy. The method may include updating, by a processor executing on a server, a notional index corresponding to an economic value of the life insurance policy, wherein i) the notional index has been updated since issuance of the life insurance policy, and ii) the notional index is based at least in part on a) a plurality of first factors based on data for life insurance policies in a class of policies, wherein the class of policies comprises the life insurance policy, and b) a plurality of second factors based on data for an individual, wherein the individual is a policy holder of the life insurance policy. The method may include determining, by the processor, an amount to apply to the policy value account based at least in part on the notional index. The method may include increasing, by the processor, at least a portion of the policy value account by the amount.

In some aspects, the present disclosure describes a method. The method may include maintaining a policy value account for a life insurance policy. The method may include determining, by a processor executing on a server, an economic value of the policy. The method may include determining, by the processor, an amount to apply to the policy value account based on the economic value. The method may include increasing, by the processor, at least a portion of the policy value account by the amount.

In some aspects, the present disclosure describes a method. The method may include maintaining a policy value account for a life insurance policy. The method may include determining, by a processor executing on a server, an economic value of the policy value account. The method may include determining, by the processor, an amount to apply to the policy value account based at least in part on the economic value of the policy value account, the policy value account, and a threshold. The method may include increasing, by the processor, at least a portion of the policy value account by the amount.

Determining the amount may include determining the amount based at least in part on a comparison between the threshold and a difference between the economic value of the policy value account and the policy value account.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 8-12 are tables of exemplary values to be used for determining the notional index and/or the economic credit;

FIG. 14 is a block diagram of an example computing device that may be used in the system of FIG. 13.

Figure 1:
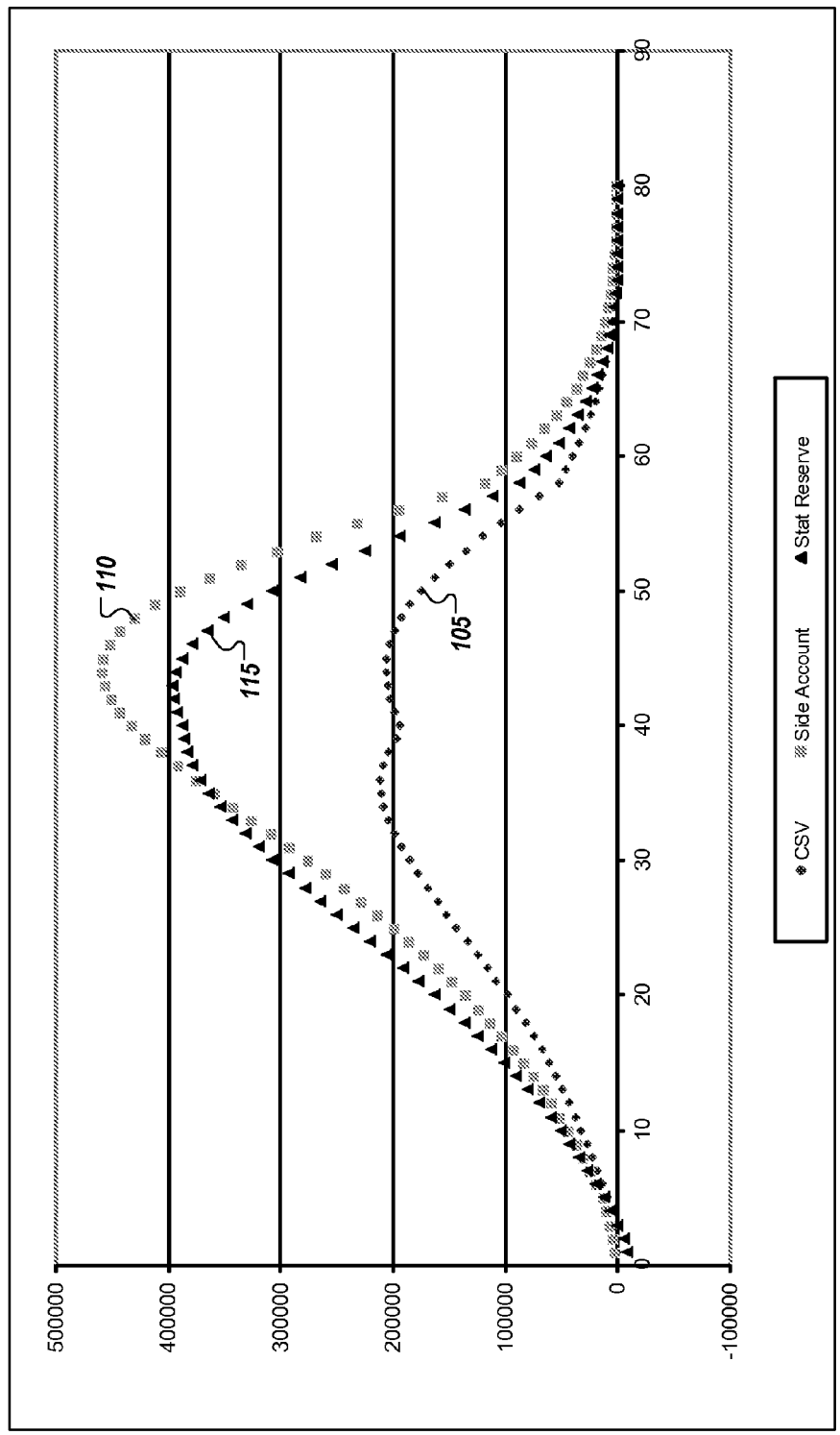
FIG. 1 is an example graphical depiction of a policy value account for a life insurance policy, an economic value of the policy, and a financial liability of the policy, all shown by the duration of the policy.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The policy value account of a life insurance policy may include the premiums the policy holder pays, from which a life insurance company or other entity administering the life insurance policy may deduct charges. The life insurance company may invest the assets supporting the financial liabilities of a life insurance policy and may thus increase or decrease the assets' value and/or the policy value account.

Any of the features described herein may be applied to a universal life insurance policy, a whole life insurance policy, and/or a variable life insurance policy, although the features may be applied to other types of life insurance policies as well. The features may also be applied to other types of insurance policies in addition to and/or in lieu of life insurance.

Generally, an insurance policy may have a duration or "term." The policy itself may also have underlying and associated rules and requirements (e.g., "terms" or "conditions" of the policy—with the duration of a policy being itself a "condition" of the policy). While the meaning of "term" (whether, e.g., "duration" or "condition") should be clear from context, it should be understood that "term" may have different (but readily discernible) meanings depending on the context.

In some aspects, the present disclosure describes a method. The method may include maintaining a policy value account for a life insurance policy. The method may include determining, by a processor executing on a server, an amount to apply to the policy value account, the amount based at least in part on i) a plurality of first factors based on data for life insurance policies in a class of policies, wherein the class of policies includes the life insurance policy, ii) a plurality of second factors based on data for an individual, wherein the individual is a policy holder of the life insurance policy, and iii) a notional index corresponding to an economic value of the life insurance policy, wherein the notional index has been updated since issuance of the life insurance policy. The method may include increasing, by the processor, at least a portion of the policy value account by the amount.

The plurality of first factors may include a plurality of product factors and a plurality of experience factors. Determining the amount may include determining the amount based at least in part on an economic value of the life insurance policy. Determining the amount may include adjusting a product factor of the plurality of product factors based on at least one experience factor of the plurality of experience factors. Determining the amount may include adjusting an experience factor of the plurality of experience factors based on a projected value for the experience factor. Determining the amount may include determining the amount months after issuance of the life insurance policy. Determining the amount may include determining the amount each month, each day, or each year. Determining the amount may include determining the amount on an irregular basis. Determining the amount may include determining that the amount falls below a threshold, and substituting the threshold for the amount. Determining the amount may include determining the amount as a function of a difference between two measures. The two measures may include a value of the policy value account for the life insurance policy and a value of a notional index.

Increasing the policy value account may include adding the amount to the policy value account for a universal life insurance policy. Increasing the policy value account may include adding the amount to the policy value account for a variable life insurance policy. Increasing the policy value account may include adding the amount a period of time after issuance of the life insurance policy.

In some aspects, the present disclosure describes a method. The method may include maintaining a policy value account for a life insurance policy. The method may include updating, by a processor executing on a server, a notional index corresponding to an economic value of the life insurance policy, wherein the notional index has been updated since issuance of the life insurance policy. The method may include determining, by the processor, an amount to apply to the policy value account based at least in part on the notional index and the policy value account. The method may include increasing, by the processor, at least a portion of the policy value account by the amount.

The notional index may have been periodically updated since issuance of the life insurance policy. Determining the amount may include determining the amount based at least in part on a value of the policy value account. Determining the amount may include determining the amount based at least in part on a difference between a value of a notional index and a value of a policy value account.

In some aspects, the present disclosure describes a method. The method may include maintaining a policy value account for a life insurance policy. The method may include updating, by a processor executing on a server, a first index, wherein the first index is based at least in part on a) a plurality of first factors based on data for life insurance policies in a class of policies, wherein the class of policies includes the life insurance policy, and b) a plurality of second factors based on data for an individual, wherein the individual is a policy holder of the life insurance policy. The method may include updating, by the processor executing on a server, a second index, wherein the second index is based at least in part on a plurality of third factors. The method may include determining, by the processor, an amount to apply to the policy value account based on the first index, the second index, and the policy value account. The method may include increasing, by the processor, at least a portion of the policy value account by the amount.

The plurality of third factors may be equal to a subset of the plurality of second factors. The plurality of third factors may not be equal to the plurality of first factors. The plurality of third factors may not be equal to the plurality of second factors.

In some aspects, the present disclosure describes a method. The method may include maintaining a policy value account for a life insurance policy. The method may include updating, by a processor executing on a server, a notional index corresponding to an economic value of the life insurance policy, wherein i) the notional index has been updated since issuance of the life insurance policy, and ii) the notional index is based at least in part on a) a plurality of first factors based on data for life insurance policies in a class of policies, wherein the class of policies includes the life insurance policy, and b) a plurality of second factors based on data for an individual, wherein the individual is a policy holder of the life insurance policy. The method may include determining, by the processor, an amount to apply to the policy value account based at least in part on the notional index and the policy value account. The method may include increasing, by the processor, at least a portion of the policy value account by the amount.

In some aspects, the present disclosure describes a method. The method may include maintaining a policy value account for a life insurance policy. The method may include determining, by a processor executing on a server, an economic value of the policy. The method may include determining, by the processor, an amount to apply to the policy value account based on the economic value and the policy value account. The method may include increasing, by the processor, at least a portion of the policy value account by the amount.

In some aspects, the present disclosure describes a method. The method may include maintaining a policy value account for a life insurance policy. The method may include determining, by a processor executing on a server, an economic value of the policy. The method may include determining, by the processor, an amount to apply to the policy value account based at least in part on the economic value of the policy, the policy value account, and a threshold. The method may include increasing, by the processor, at least a portion of the policy value account by the amount.

Determining the amount may include determining the amount based at least in part on a comparison between the threshold and a difference between the economic value of the policy and a value of the policy value account.

In some implementations, life insurance policies may be designed to satisfy different combinations of policy holder objectives. For example, policies may be designed to offer policy holders flexibility regarding the size and timing of their premiums. The flexibility may enable policy holders to allocate their resources between their policies and other obligations at their convenience, which may make such policies attractive.

Flexibility in premium payments may present challenges for life insurance companies issuing the policies. In general, life insurance companies may aggregate premiums from policy holders for investment in various financial vehicles. Different patterns of premium payments may impact the amount of assets available to the company for investment. Different patterns of premium payments may impact the investment return on the assets due to temporal variations in market conditions. Different patterns of premium payments may incentivize the life insurance company to adopt riskier or more conservative approaches to investment, thereby potentially impacting the investment returns on the assets. Different patterns of premium payments may impact liquidity of the life insurance company's investments, thereby potentially impacting the company's allocation of assets to liquid investments with, e.g., lower yields. Different patterns of premium payments may have various other impacts on the economic value of the invested assets.

Since a life insurance company may aggregate premiums for investment, the effects of the policy holders' patterns of paying premiums may be shared among all of the policies with respect to which premiums have been paid, benefitting some policy holders while not benefitting others. Allocating at least a portion of the investment returns on the aggregated premiums to a policy based on the particular policy's contribution to the increase in an economic value of the life insurance company's assets may be, e.g. desirable.

In general overview, the present disclosure describes increasing a policy value account of a life insurance policy based on an economic value of the policy. A life insurance company, financial institution, or other entity (also generally referred to herein as "the life insurance company," "a company," or "the company"), may maintain a policy value account for a policy, such as the policy value account 105 shown in the example graph of FIG. 1 as CSV, or "cash surrender value." The life insurance company may create and/or maintain a notional index corresponding to an economic value of the policy, such as the notional index 110 shown in the example graph of FIG. 1 as a "Side Account." A financial liability 115 is shown in the example graphical depiction of FIG. 1 as a "Stat Reserve." In FIG. 1, the horizontal axis represents duration (e.g., number of months) since the example life insurance policy was issued and the vertical axis represents a monetary amount (e.g., dollars).

In some implementations, the life insurance company may determine an amount to apply to the policy value account based at least in part on the policy value account 105 and the notional index 110.

The life insurance company may increase at least a portion of the policy's policy value account by the amount. The life insurance company may increase the policy value accounts of policies with larger economic values more than the policy value accounts of policies with smaller economic values. The life insurance company may increase the policy value accounts of policies with larger differences between an economic value and the corresponding policy value account by more than the policy value account of policies with smaller differences. Any of the features described herein may be applied to a universal life insurance policy, a whole life insurance policy, and/or a variable life insurance policy, although the features may be applied to other types of insurance policies as well.

In some implementations, life insurance policies may be commoditized, bundled, or otherwise configured for purchase, sale and/or trade as, e.g., financial instruments, on, e.g., an exchange or other trading venue or platform.

Creating and Maintaining the Policy's Policy Value Account

In further detail, the life insurance company may create and/or maintain a policy value account for a life insurance policy. The policy value account may be created when the company issues a new policy. The policy value account may be created when the company acquires an existing policy from another life insurance company. In some implementations, the policy's benefits may be determined on a basis that does not change after issuance of the policy. In some implementations, the life insurance company may reserve the right to change the basis for determining such benefits after issuance.

The policy value account may include a declared interest account. The declared interest account may be determined based at least in part on the premiums paid by the policy holder. In some implementations, the declared interest account may include a portion of the premiums paid by the policy holder. In some implementations, the declared account may include a portion of each premium paid by the policy holder. In some implementations, the declared interest account may include a portion of each premium, wherein the portion varies by the timing of each premium paid by the policy holder. In some implementations, the life insurance company may apply an interest rate to the declared interest account. In some implementations, the interest rate may vary with the duration of the life insurance policy. In some implementations, an underlying rule or requirement (e.g., a policy "term" or "condition") of the policy may determine the interest rate. In some implementations, the policy may identify a minimum interest rate (e.g., 1.5%, 2%; also referred to herein as "guaranteed interest rate") to be applied to the declared interest account. In some implementations, at, e.g., predetermined periods of time (e.g., daily, monthly, annually), the company may determine an amount of interest to apply to the policy value account based on the declared interest account. In some implementations, the periods of time may be variable length and amount(s) of interest may be determined, e.g., on an irregular basis.

In some implementations, the company may apply an interest rate exceeding a minimum rate (also referred to herein as a "current interest rate") to the declared interest account. The company may determine the current interest rate based on investment returns for all or a part of a company investment account. For example, a policy may identify a guaranteed interest rate of 2%, but based on investment returns for the life insurance company's investment account, the life insurance company may decide to apply a higher interest rate. The company may determine the current interest rate based on investment returns for all or part of the company's investment account. The company may determine the current interest rate based on current and/or projected investment returns. The company may determine the current interest rate based on investment returns that have been modified by smoothed capital gains and/or losses. The gains and/or losses may have been smoothed over any period of time (e.g., 15 years).

For example, the company may determine that the company's investment account yielded, e.g., a 6% investment return. In some implementations, the company may apply, e.g., a 6% interest rate to the declared interest account of a policy. In some implementations, the company may apply a lower interest rate than the investment return rate. For example, the company may take a spread (e.g., 1%, 1.5%, 2%) off the investment return rate to cover expenses, obtain a profit, or achieve any other business objective of the company. The company may apply the remaining interest rate to the declared interest account. For example, the company may take a 1.5% spread on a 6% investment return and apply a 4.5% current interest rate. In some implementations, the company may deduct expenses, profit, and/or other amounts from the increase in its investment account and determine a current interest rate based on the remaining amount. The company may determine the current interest rates through any other method.

The life insurance company may deduct charges from the policy value account, which may decrease its value. Charges may be associated with, for example, the cost of providing the insurance itself, administrative expenses incurred by the life insurance company, or any other business concern. In some implementations, the company may deduct a spread off the investment return rate that varies by duration, by funding pattern, or any other factor. The company may apply the remaining investment return rate to the policy value account.

In some implementations, the life insurance company may deduct premium charges. In some implementations, the premium charge may correspond to revenue secured by the life insurance policy. In some implementations, the premium charge may be applied to each premium paid by the policy holder. In some implementations, the premium charge may vary by the duration of the life insurance policy. In some implementations, the premium charge may be an underlying rule or requirement (e.g., a policy "term" or "condition") of the life insurance policy. In some implementations, the policy may include a premium charge of 10%. Thus, a life insurance company may deduct 10% of each premium paid by the policy holder and allocate the remainder to the holder's policy value account.

In some implementations, the premium charge may be based on characteristics of the policy holder and/or the policy. For example, the life insurance company may select a premium charge based on the policy holder's age, gender, and/or risk class; the duration of the policy (e.g., a policy "term" in the sense of the length in time of the policy); the amount of premium paid in a particular policy year; and/or any other factor. For example, the life insurance company may select a premium charge from one or more tables of actuarially-determined premium charges, classified by, e.g., any of the aforementioned factors. For example, a table may include premium charges for females between 20-34 years of age and males between 20-34 years of age. For a female policy holder between 20-34 years of age, the life insurance company may select the premium charge corresponding to the holder's characteristics and deduct the premium charge from the holder's premiums. The life insurance company may allocate the remainder of the premiums to the holder's policy value account.

In some implementations, the premium charge may be determined by the life insurance policy. In some implementations, the premium charge may be determined by the life insurance company at its discretion. The policy may enable the company to set premium charges according to, e.g., the company's business objectives. In some implementations, the policy may set minimum and maximum limits on the premium charge.

In some implementations, the life insurance company may deduct a cost of insurance charge. The cost of insurance charge may be associated with the cost of providing insurance coverage. In some implementations, the cost of insurance charge may be associated with any other business objective. The cost of insurance charge may be associated with the risk of paying a death benefit for the policy holder. In some implementations, the cost of insurance charge may be deducted from the policy value account on a monthly basis, although other periods of time may be used.

In some implementations, the cost of insurance charge may be determined according to the net amount at risk for the life insurance policy. The net amount at risk may be associated with assets external to the policy that the life insurance company would need to provide to pay the policy's death benefit. In some implementations, the net amount at risk may be the difference between the death benefit and the policy value account. In some implementations, the net amount at risk may be the difference between the death benefit and the cash surrender value of the policy. In some implementations, the net amount at risk may not be reduced by the policy value account. In some implementations, when determining the net amount at risk, the death benefit may be discounted at an interest rate back to the date the cost of insurance charge is assessed.

In some implementations, the cost of insurance charge may be a cost of insurance factor applied to the policy's net amount at risk. The cost of insurance factor may be represented as a dollar amount per $1000 of the net amount at risk (e.g., $12/1000 net amount at risk, $15/1000 net amount a risk). The cost of insurance factor may be determined according to, e.g., actuarial characteristics of the policy holder (e.g., age, gender, smoker/non-smoker), the policy, or both. The cost of insurance charge may be determined by multiplying the cost of insurance factor by the net amount at risk.

In some implementations, the life insurance company may deduct an expense charge. Expense charges may be associated with costs borne by the life insurance company to provide the policy. In some implementations, expense charges may be associated with any other business objective. Examples of such costs may include training life insurance agents, paying commissions to the agents, advertising, interviewing potential policy holders, conducting background checks and/or medical examinations on the policy holders, underwriting life insurance policies, or any other expense.

In some implementations, the life insurance company may deduct an administrative charge. Administrative charges may be associated with the company's operational costs. In some implementations, administrative charges may be associated with any other business objective. Example costs may include training and maintaining customer service personnel, compensation for support staff, rent, or any other administrative expense.

In some implementations, the life insurance company may deduct a contract charge. The basis of the contract charge may be a dollar amount per $1,000 of the policy's face amount (e.g., the death benefit). The basis may vary by, e.g., the duration of the policy, the policy holder's gender or risk class, the presence of a particular benefit, rider, or endorsement in the contract, or any other factor. In some implementations, the contract charge may be deducted for an initial duration of the policy. For example, the contract charge may be deducted solely for the first five years of the policy. In some implementations, the contract charge may be deducted for an extended duration of the policy, e.g., for the entire duration of the policy, or some portion of the duration of the policy.

In some implementations, the policy value account may include a loan account. A policy holder may take a loan on his or her life insurance policy. The amount of the size of the loan may be reallocated from another account in the policy, e.g., the declared interest account, to a loan account. The life insurance company may charge an interest rate for the loan. In some implementations, the policy may identify a maximum interest rate charged for the loan. In some implementations, the company may charge an interest rate for the loan that is less than the maximum. As a policy holder repays the loan, assets may be reallocated from the loan account to another account in the policy, e.g., the declared interest account. In some implementations, the life insurance company may apply the portion of repayment corresponding to the principal of the loan to another account in the policy, e.g., the declared interest account. In some implementations, the life insurance company may apply the entire repayment to another account in the policy, e.g., the declared interest account.

In some implementations, the amount of the size of the loan may be kept as a lien against the policy value account. The life insurance company may charge an interest rate for the loan. As a policy holder repays the loan, the lien may be decreased by the same amount as the loan.

In some implementations, the life insurance company may apply an interest rate to the loan account. In some implementations, the interest rate may vary with the duration of the policy. In some implementations, an underlying rule or requirement of the policy may determine the interest rate. In some implementations, the company may determine (e.g. at predetermined periods of time) an amount of interest to apply based on the loan account. In some implementations, the life insurance company may take a spread off the repayment, which may accrue to the company as revenue, by way of example. For example, the life insurance company may loan a policy holder $10,000 at 3% interest. The policy holder may repay $10,300 for the loan of $10,000. The life insurance company may take a spread of 1% as profit, thereby allocating 2% to the policy value account as the holder repays. Thus, according to the example, the life insurance company may increase the policy value account by $10,200 by the time the holder finishes repayment, while reducing the loan account to $0.

In some implementations, the policy holder may make a withdrawal from his or her policy to access a portion of the cash surrender value. The life insurance company may decrease the policy value account by the amount of the withdrawal and may transfer the amount to the policy holder personally. In some implementations, charges applied to the policy value account may be adjusted according to the updated policy value account. For example, since the policy value account has decreased, the net amount at risk may increase, thereby increasing the cost of insurance charge deducted from the policy value account.

In some implementations, the policy holder may surrender his or her policy. For a full surrender, the life insurance company may transfer the cash surrender value of the policy to the policy holder. In some implementations, the cash surrender value may be the policy value account minus the cash surrender charge. In some implementations, the cash surrender charge may correspond to costs borne by the life insurance company to issue and/or maintain the life insurance policy. In some implementations, the cash surrender charge may correspond to any other business objective.

For a partial surrender, the life insurance company may transfer at least a portion of the policy value account to the policy holder. The life insurance company may decrease a death benefit of the policy. The life insurance company may decrease the policy value account by the amount of the partial surrender and transfer the amount to the policy holder personally. In some implementations, charges that are applied to the policy value account and that are based at least in part on the policy value account and/or death benefit may be adjusted accordingly. For example, the decrease in death benefit may result in a decrease in a contract charge.

Creating and/or Maintaining the Notional Index for an Economic Value of the Policy In some implementations, as the life insurance company creates and/or maintains a life insurance policy, the company may create and/or maintain a notional index corresponding to an economic value of the policy. To determine an economic value of the policy, the notional index may incorporate data about the policy since the policy's issuance. In some implementations, the notional index may be updated on a daily, monthly, or yearly basis, although other periods of time may be used. In some implementations, the notional index may be updated on an irregular basis, e.g., monthly for several periods, daily for several periods, etc. In some implementations, the notional index may be updated in response to the provision of updated data.

In general overview, in creating and/or maintaining the notional index, a life insurance company may use at least some factors that may be similar or analogous to factors for determining the policy value account. For example, the notional index may include a sum of the premiums paid by the policy holder. For example, the notional index may include the timing of each premium paid by the policy holder. For example, the notional index may include the amount of each premium paid by the policy holder. The life insurance company may apply an interest rate to the amount in the notional index (also referred to herein as "notional index interest rate"). The life insurance company may deduct charges from the notional index, e.g., similar to charges deducted from the policy's policy value account. Since the notional index may correspond to an economic value of the life insurance policy, the values of factors for determining a policy's notional index may differ from the values of factors that determine the policy value account, as described further below. Further, the notional index may include factors beyond the factors used to determine the policy value account. The notional index may include none, some, or all of the factors, or any combination of same, used to determine the policy value account.

In some implementations, the life insurance company may use factors that are based in part on projected values for determining the notional index. In some implementations, the life insurance company may use product factors that are based in part on projected values for determining the notional index. The projected values may correspond to, or may be based at least in part on, the life insurance company's expected values for the factors over a predetermined period of time. For example, the projected values may correspond to expected values for the factors for the next three months, six months, year, or any other period of time. In some implementations, the projected values may be based on trends identified for historical data, as described further below. In some implementations, the projected values may be based at least in part on the difference between previously projected values for a given factor and the actual values for the given factor. In some implementations, the cost of insurance rates may be determined in part based on projected mortality rates. In some implementations, the projected mortality rates may be, e.g., the values of experience factors based on trends in historical mortality data from like groups of policyholders. In some implementations, the expense charges may be determined in part based on projected expenses.

In some implementations, projected expense charges may be values for experience factors based at least in part on trends in historical data for expenses regarding like groups of policies. In some implementations, projected expense charges may be values for experience factors based at least in part on administrative expenses for groups of policies that include the life insurance policy. In some implementations, the expense charges may be based in part on any other factor such as profit goals, capital requirements, or risk assessments.

In some implementations, the life insurance company may use experience factors, product factors, and/or policy holder factors to determine the notional index. The experience factors, product factors, and policy holder factors may impact one another's values, as described further below.

In further detail, in some implementations, experience factors may be based, at least in part, on, e.g., projected values of the aggregated experiences of life insurance policies within the policy holder's class of policies. The persistency rate for the class of policies may be used, at least in part, to determine an experience factor. The persistency rate may be the percentage of policy holders or the percentage of death benefit for the policy holders within the class of policies who maintain their policies for a period of time (e.g., a day, a month, a year, or any other period of time). Non-persisting policy holders may include holders who fully surrender their policies and/or holders who allow their policies to lapse.

In some implementations, the cash surrender values of the fully surrendered policies may be lower than the economic values of the policies. Thus, after paying the cash surrender values for the policies, the life insurance company may retain at least a portion of the assets supporting the future benefits for the surrendered policies. In some implementations, an amount based at least in part on the projected values of the assets may be distributed among the remaining policy holders in the class of policies.

In some implementations, at least a portion of the assets supporting future benefits for the surrendered policies may be used to support future benefits for persisting policies by increasing the policies' notional index. For example, if 5% of policy holders in the class failed to maintain their policies the previous year, the life insurance company may project that 5% of policy holders will fail to maintain their policies in the coming year. In some implementations, the life insurance company may increase the notional index for a policy holder by 5% of the difference between the notional index and the policy value account. In some implementations, the life insurance company may increase the notional index for a policy holder by 5% of the difference between the notional index and the cash surrender value of the policy.

In some implementations, the life insurance company may increase the notional index at the beginning of the year, the end of the year, or any other time. In some implementations, the amount will be calculated and applied on a monthly basis. In some implementations, the increase may be smoothed by dividing the increase into amounts to be applied to the notional index on a monthly basis.

The notional index interest rate may be a product factor. The notional index interest rate may be associated with projected investment returns on the life insurance company's investment account. For example, the life insurance company may determine that the investment account yielded a 6% investment return for the past year. The company may use this rate of return to project that the investment account may yield a 6% investment return in the coming year. The company may determine the notional index interest rate based on the projected rate of return. In some implementations, the notional index interest rate may be set equal to the projected rate of return. Thus, at least a portion of the entire projected economic return on assets may be credited to the policy holder. In contrast, as described above, the life insurance policy may take a spread on the projected investment rate of return and may apply a lower interest rate to the policy value account.

In some implementations, product factors may include factors that may define a policy's benefits for its holder (e.g., factors that define the policy value account, cash surrender value). The duration of a policy may be a product factor. Charges applied to the notional index, corresponding to charges applied to the policy value account described herein, may be product factors. Factors for determining the values of the charges may be product factors. Minimum and/or maximum guaranteed values for factors (e.g., maximum premium charge, guaranteed interest rate) may be product factors.

In some implementations, the life insurance company may use different values and/or determinations for product factors regarding charges applied to the notional index than for charges applied to the policy value account. In some implementations, the life insurance company may apply different premium charges to the notional index than to the policy value account. For example, the cost of issuing an insurance policy may exceed premiums paid by the policy holder in the first three years of the policy. For the notional index to reflect the initial negative economic value of the policy, a life insurance company may apply a 50% charge against premiums paid during the first three years of the policy. After the company has recuperated at least some of its costs, the company may apply, for the notional index, a 5% charge to premiums paid after the third year of the policy. In contrast, the terms of the policy may identify a premium charge of 10% applied to every premium paid before allocating the remainder of the premium to the policy value account.

In some implementations, the life insurance company may apply different cost of insurance charges to the notional index than to the policy value account. For example, the company may apply a cost of insurance charge equal to 100% of the projected expected mortality to the notional index. In contrast, to recover costs associated with the policy, the company may apply a cost of insurance charge equal to 200% of the projected expected mortality to the policy value account for the first five years of the policy.

In some implementations, the company may apply different cost of insurance factors to the notional index than to the policy value account. The cost of insurance factors may be determined according to objectives for the policy, among other factors. For example, a policy may be designed to have, for a given amount of premium, a low account value and a high death benefit, relative to other policy designs. Such a policy may have high costs of insurance, keeping the account value relatively low. The same policy may be designed such that the cost of insurance applied to the notional index may be lower than the cost applied to the policy value account (e.g., $8/1000 of the net amount at risk, in contrast to $12/1000 of the net amount at risk).

In some implementations, the life insurance company may use a different basis for determining a charge for the notional index than for the policy value account. For example, although the cost of insurance charge for the notional index and policy value account may be determined according to the net amount at risk, the net amount at risk for the notional index and policy value accounts may be determined differently. For a notional index, the net amount at risk may be the difference between the present value of the death benefit of the policy and the notional index. In contrast, for the policy value account, the net amount at risk for the policy may be the difference between the death benefit and the policy value account or the cash surrender value of the policy.

In some implementations, the life insurance company may adjust a product factor based on at least one experience factor. For example, the cost of insurance factor may be associated with the experienced mortality rate of a class of people. Improvements in health care may contribute to an experienced decline in mortality rates for the policy holders over 55 years of age. The life insurance company may determine that the mortality rate for the class decreased by 3% the previous year. The company may project that the mortality rate for the coming year may decrease by 3%. As the mortality rate decreases, the probability (e.g., the risk) that the life insurance company may pay death benefits for such policy holders in the next year decreases. Accordingly, the life insurance company may lower the cost of insurance rate for policy holders over 55 years of age based on the decline in the mortality risk. The life insurance company may apply a lower cost of insurance factor to determine a cost of insurance charge to deduct from a policy's notional index. In some implementations, any other data indicating an experienced increase or decline in mortality rates may result in an adjustment in the cost of insurance.

In another example, the experienced persistency rate may impact the cost of insurance factor. In some implementations, if a class of policy holders has a high rate of persistence, the experienced mortality rate may decrease as a result of healthier policy holders persisting at a higher rate than expected due to, e.g., improving economic conditions. In some implementations, the life insurance company may determine a projected cost of insurance factor based at least in part on the change in the experienced persistence. Thus, for example, the company may lower the cost of insurance factor from, e.g., $9/1000 net amount at risk to $7.50/1000 net amount at risk.

In another example, the experienced investment return on assets in the investment account associated with the class of policy may impact the notional index interest rate. In some implementations, based on the assets' rate of return, the life insurance company may determine a notional index interest rate to apply to the notional index, as described herein. In some implementations, the experienced investment return on a published set of assets may impact the notional index interest rate In further detail, policy holder factors may correspond to actions of the policy holder that impact the economic value of the policy. Such actions may impact the economic value of the policy by, among other things, influencing the amount of assets available for the insurance company to invest and/or the availability of assets during different market conditions.

In some implementations, the sizes of the premiums paid may be policy holder factors. When a policy holder pays larger premiums, the life insurance company may hold more assets to invest. When applied to a larger amount of assets, the rate of return achieved through the company's investments yields a larger absolute return. The notional index may incorporate a portion of the economic gain or loss experienced based on the sizes and/or date of each premium payment.

In some implementations, the timing of premiums may be a policy holder factor. For example, suppose a policy holder must pay $100 within the next year for his or her policy to remain in force. If the policy holder pays the $100 at the beginning of the year, the $100 may have the entire year to earn interest and/or another investment return. If the policy holder pays the $100 at the end of the year, the $100 may have negligible time to produce returns for that year.

In another example, over the course of the year, interest rates may fluctuate. A policy holder may pay a $100 premium when interest rates are high. One month later, the interest rate may drop unexpectedly, and another policy holder may pay the same premium after the decline. The return earned by the company's investments of the policy holder's premiums when interest rates were high result in more economic value being generated by the first policy holder's policy. In some implementations, the notional index may incorporate data about the expected investment gain based on the time of a policy's premium payment, differing market conditions, and/or the length of time the policy cash flows are available for the company to invest.

In some implementations, surrender of a policy may be a policy holder factor. When a policy holder surrenders his or her policy, either fully or partially, the life insurance company may return assets to the policy holder. The company may transfer assets from an investment account to the policy holder. The company may liquidate investments to provide assets for the policy holder. Such actions may decrease the amount of assets available for the life insurance company to invest. The life insurance company may distribute the projected excess at the moment of surrender of the notional index over the policy value account to other policies in the policy holder's class. The company may cease to maintain the notional index, policy value account, and/or cash surrender value for the surrendering policy holder. In some implementations, partial surrender of a policy decreases the notional index by at least a portion of the policy's cash surrender value or policy value account. The company may continue maintaining the policy's notional index.

In some implementations, taking loans on a policy may be a policy holder factor. A life insurance company may transfer assets equal to the size of the loan(s) to the policy holder, thereby reducing the amount of assets available for investment. In some implementations, the notional index decreases by the amount of each loan. In some implementations, the life insurance company may decrease the notional index based at least in part on the amount of the loan and the difference between the investment account's investment rate of return and the interest rate on the loan.

In some implementations, reinstatement of a policy may be a policy holder factor. Renewed payment of premiums may increase the amount of assets available for the life insurance company to invest. In some implementations, the life insurance company may have stopped maintaining the policy's notional index when the policy lapsed. In some implementations, the notional index until the time of reinstatement may be reconstructed. In some implementations, upon reinstatement of the policy, the value of the notional index may be set equal to the value of the notional index when the policy lapsed.

In some implementations, adding and/or terminating a rider may be policy holder factors. Riders may increase the required premiums for the policy. Riders may change the risk factors for insuring the policy holder, thereby impacting charges applied to the policy value account and/or notional index and thus, the values of such accounts. For example, a policy holder may purchase a disability rider. The life insurance company may account for the risk of paying disability benefits in addition to the risk of paying the death benefit. In some implementations, the life insurance company may deduct an additional cost of insurance charge based on the policy holder's risk of disablement.

In another example, a policy holder may purchase a rider to begin accessing his or her policy's death benefit prior to death. In some implementations, access to the death benefit may be conditioned on predetermined events, such as becoming in need of assistance with activities of daily living or diagnosis of defined medical conditions. The life insurance company may account for the risk of the obligation to transfer assets to the policy holder prior to death. In some implementations, the life insurance company may deduct an additional cost of insurance charge based on the probability of events in the riders transpiring.

In some implementations, riders may change the benefits of the policy. In some implementations, the changes for these benefits may be applied to the notional index and/or policy value account. For example, a rider may provide supplemental coverage for a policy. A policy holder may purchase a rider to provide additional coverage for a dependent in event of the policy holder's death. The rider may increase the death benefit. Since the net amount at risk may be determined as the difference between the policy's death benefit and the policy value account, an increase in the death benefit may increase the net amount at risk and any charge determined based on this amount. In some implementations, termination of a rider removes any of the impacts of prospective riders described herein.

In some implementations, replacement of a policy may be a policy holder factor. A policy holder may fully surrender a currently held policy and purchase a new policy. In some implementations, terms of the policies may effectively duplicate the economic value of the surrendered policy for the economic value of the new policy. Thus, the notional index for the surrendered policy may be maintained as the notional index for the new policy. Nevertheless, the life insurance company may be obligated to pay the life insurance agent in the transaction a commission. In some implementations, the policy holder may replace his or her policy multiple times, each replacement resulting in a commission paid to the life insurance agent and/or fees associated with other sale-related expenses. In some implementations, the life insurance company may levy charges on the premiums paid into the replacement policy and/or on the policy value account or the notional index based on projected expenses incurred in the case of a replacement (e.g., the commissions paid to life insurance agents for each policy replacement).

In some implementations, changing the death benefit option for a policy may be a policy holder factor. In some implementations, a policy holder may have a policy whose death benefit equals the face amount of the policy. In some implementations, the policy holder may change the death benefit option such that the death benefit includes the face amount and policy value account. In some implementations, the policy holder may change the death benefit option in the opposite manner. Since according to the examples the two policies have different net amounts at risk, charges based on the net amount at risk (e.g., the cost of insurance charge) that are applied to the notional index and/or the policy value account may be adjusted accordingly.

In some implementations, policy holder factors may include actions taken by the policy holder that may change the risk of insuring the policy holder. Such actions may place the policy holder in a different risk class. For example, a policy holder may be a smoker who decides to quit smoking. A policy holder may be classified in a new risk class based on age (e.g., turning 55 years of age and thereby becoming a member of the risk class for 55-70 year olds).

In some implementations, the policy holder actions may impact the policy holder's morbidity risks (e.g., health). The change to the policy holder's morbidity risk may impact the company's risk for insuring the policy holder. For example, the policy holder may join a health club. The policy holder may exercise at the health club at least three times a week. The policy holder may purchase a car. The policy holder may move from a desk job to a less sedentary job, or vice versa. The policy holder may become a vegetarian. The policy holder may join an interest group for outdoor activities. The policy holder may enter a nursing home. For such exemplary actions, in some implementations, the life insurance company may adjust the cost of insurance charge for the policy holder and apply the adjustment to at least the policy holder's notional index. For such exemplary actions, the life insurance company may adjust the cost of insurance charge for the policy holder and apply the adjustment to at least the policy holder's notional index and/or policy value account.

In some implementations, the policy holder actions may impact the experience factors for the class of policies. For example, surrender of a policy may impact the rate of persistency for policy holders of the class of policies. The size and timing of premiums may impact the amount and availability of assets for the life insurance company to invest, thereby likely impacting the investment rate of return for assets, e.g., assets backing the policies including the life insurance policy holder's class of policies. The policy holder's death may impact the cost of insurance factor (e.g., the mortality risk) for the holder's class of policy holders.

In some implementations, the life insurance company may determine an amount to apply to the policy value account (also referred to herein as an "economic credit"). In some implementations, the economic credit may be based on the notional index and the policy value account, although other factors may be used.

Determining the Economic Credit and Applying the Credit to the Policy

In some implementations, a life insurance company may determine the economic credit at least in part by taking a difference between the notional index and the policy value account (also referred to herein as "preliminary economic discrepancy"). The company may determine the economic credit by multiplying the discrepancy by an economic credit factor. In some implementations, the economic credit factor may be an underlying rule or requirement (e.g., a policy "term" or "condition") of the life insurance policy. In some implementations, the life insurance company may set the value of the economic credit factor according to its business objectives. The economic credit factor may be a percentage (e.g., 45%). Thus, in some implementations, the economic credit may be determined by taking a percentage or proportion of the preliminary economic discrepancy.

In some implementations, the economic credit may be determined to maintain a predetermined ratio between the policy value account and notional index. For example, the life insurance company may determine that policy value accounts for policies in a class should be maintained at 45% of their notional indices, although any other percentage may be used. A policy value account may be $385, and a notional index may be $1000. In some implementations, the economic credit would be determined to be $65 because increasing the policy value account by $65 would result in a 45:100 ratio between the policy value account and the notional index.

In some implementations, the economic credit may be determined at least in part on the economic value of a theoretical policy of the class of policies (symbolized herein as $Th_t$). The theoretical policy may be a model of a policy that follows a predefined pattern of paying premiums, although the model may incorporate other or different assumptions regarding policy holder factors, product factors, and/or experience factors. Thus, the economic credit may incorporate data about the policy's deviation from the theoretical policy and/or the economic value such a policy would generate.

In some implementations, an economic value of the theoretical policy may be multiplied by an adjustment factor s. The economic credit may be determined by subtracting the adjusted value of the theoretical policy, e.g. $s*Th_t$, from the preliminary economic discrepancy.

In some implementations, the economic credit may include a comparison between the notional index and the theoretical policy. The notional index may be multiplied by an adjustment factor r. The adjusted notional index $r*NA_t$ may be compared to $s*Th_t$, and the maximum of the two values may be taken and subtracted from the preliminary economic discrepancy to determine the economic credit. Thus, the economic credit may be determined by the following formula:

$$EC = NA_t - AV_t - \text{Max}(r^* NA_t, s^* Th_t)$$

In some implementations, the values of r and s may be 0.55 and 1.00, respectively. In some implementations, the value of s may be lowered for each partial withdrawal.

Without wishing to be bound by theory, if a policy has little economic value, the economic value of the theoretical policy may limit the economic credit for the policy. In some implementations, the theoretical policy may thus minimize the economic credit. If a policy has a larger notional index than that of the theoretical policy, the economic credit may be determined based, at least in part, on the notional index and adding at least a portion of the economic value of the policy to the policy value account.

In some implementations, the economic credit may be increased or decreased based on loans taken against the policy. For example, the amount of a loan may be multiplied by the difference between the notional index interest rate and the interest rate for the loan. In some implementations, if a policy holder has taken more than one loan from the policy, the amount of each loan may be multiplied by the difference between the notional index interest rate and each interest rate for each loan. The resulting amount(s) may correspond to the increase and/or decrease in economic value for the policy due to the loan(s). In some implementations, such resulting amount(s) may be subtracted from the notional index to account for loans taken against the policy.

In some implementations, the economic credit may be set to zero (0) for an initial duration of the life insurance policy. For example, the economic credit may remain zero (0) for the first ten years (e.g., 120 months) of the policy, although other periods of time may be used. According to the example, after the initial duration, the economic credit may be determined according to any method described herein.

In some implementations, the economic credit may have a guaranteed minimal value. For example, the economic credit may include a percentage of the policy value account. For example, the economic credit may include 25 basis points (e.g., 0.025%), 30 basis points (0.03%), or any other number of basis points applied to the policy value account. If the economic credit thus determined exceeds the economic credit determined by any other steps described herein, the economic credit thus determined may be applied to the policy's policy value account.

The policy value account of a policy may be increased by the amount of the economic credit. In some implementations, economic credits may be applied to policy value accounts after predetermined initial durations of the policies. For example, an economic credit may be applied after ten (10) years have elapsed since the policy issued. Thus, the economic credit may be applied in the eleventh ($11^{th}$) year of the policy. In some implementations, an economic credit may be applied after five (5) or fifteen (15) years have elapsed since the policy issued. Other periods of time may be used.

In some implementations, the economic credit may be applied after a life insurance company has recuperated expenses associated with issuing the policy (e.g., training insurance agents, locating potential policy holders, interviewing potential policy holders, conducting background checks and/or medical examinations, performing actuarial analysis regarding the policy holders' risk, underwriting policies, compensating life insurance agents, advertising and marketing of the policy, etc.). In some implementations, data about such projected expenses may be incorporated into the cash surrender charge. Without wishing to be bound by theory, in some implementations, the cash surrender charge may decline to substantially zero after the life insurance company has recuperated expenses associated with issuing the policy. Thereafter, the life insurance company may begin determining and applying economic credits to the policies.

Example Methods of Determining the Economic Credit

Figure 2:
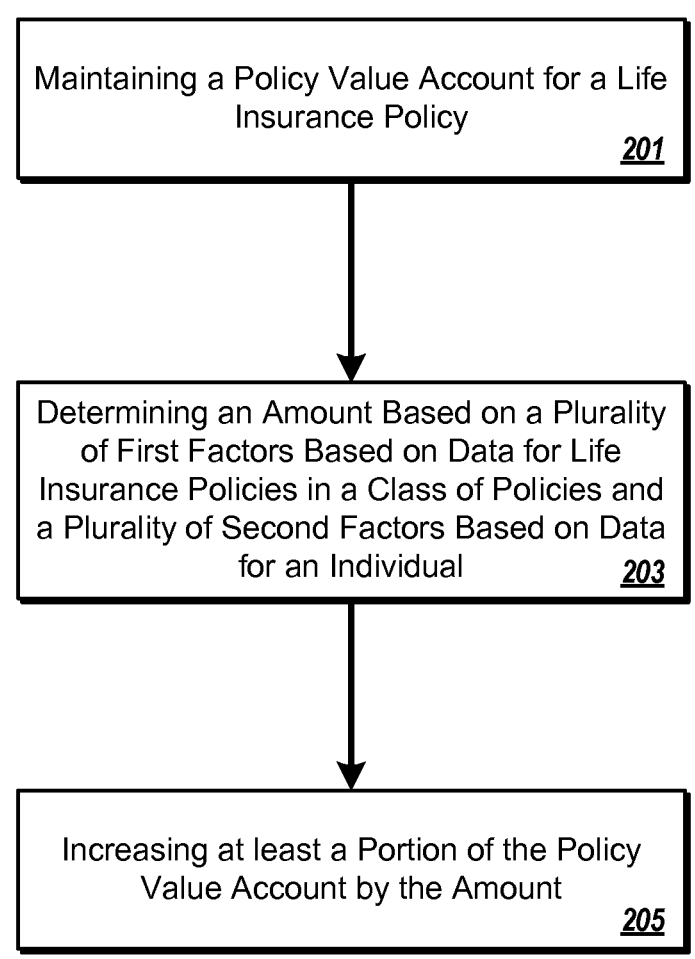
FIGS. 2-7 are flow diagrams of example methods for increasing the policy value account of a life insurance policy based on an economic value of the policy.

Referring now to FIG. 2, a flow diagram 200 of an example method for increasing a policy value account of a life insurance policy based on the economic value of the policy is shown and described. The method may include maintaining a policy value account for a life insurance policy (step 201). A life insurance company may create a policy value account for a life insurance policy. The company may increase the policy value account by the premiums paid by the policy holder. The policy value account may be increased each time the policy holder pays a premium. The company may deduct charges from the policy value account (e.g., premium charges, cost of insurance charges, administrative charges, contract charges). In some implementations, charges may be deducted on a monthly and/or annual basis. The company may apply an interest rate to the policy value account.

The method may include determining an amount to apply to the policy value account (step 203). The amount may be based at least in part on a plurality of first factors based on data for life insurance policies in a class of policies, wherein the class of policies includes the life insurance policy, and a plurality of second factors based on data for an individual, wherein the individual is a policy holder of the life insurance policy.

The plurality of first factors may include experience factors, as described herein. Values of the experience factors may aggregate experienced results for policies belonging to the same class. Values of the experience factors may be projected values for the factors for a predetermined period of time (e.g., the coming month, the coming year). The plurality of first factors may include product factors, as described herein. In some implementations, values of the product factors may be the values used for policies in the same class. In some implementations, values of the product factors may be adjusted according to values of the experience factors. The plurality of second factors may include policy holder factors. Policy holder factors may include the size and timing of premiums paid by the policy holder, the size and timing of loans taken on the policy, or any other policy holder action described herein.

The amount may be determined on a daily, monthly, quarterly, or yearly basis, although the amount may be determined at other periods of time. In some implementations, the amount may have a minimum guaranteed value. If the amount determined by any of the methods described herein is less than the minimum guaranteed value, the amount may assume the minimum guaranteed value.

The method may include increasing at least a portion of the policy value account by the amount (step 205). The policy value account of a policy may be increased by the amount. In some implementations, the policy value account may be increased after an initial duration of the policy has elapsed (e.g., 5 years, 10 years, 11 years, 15 years).

Figure 3:
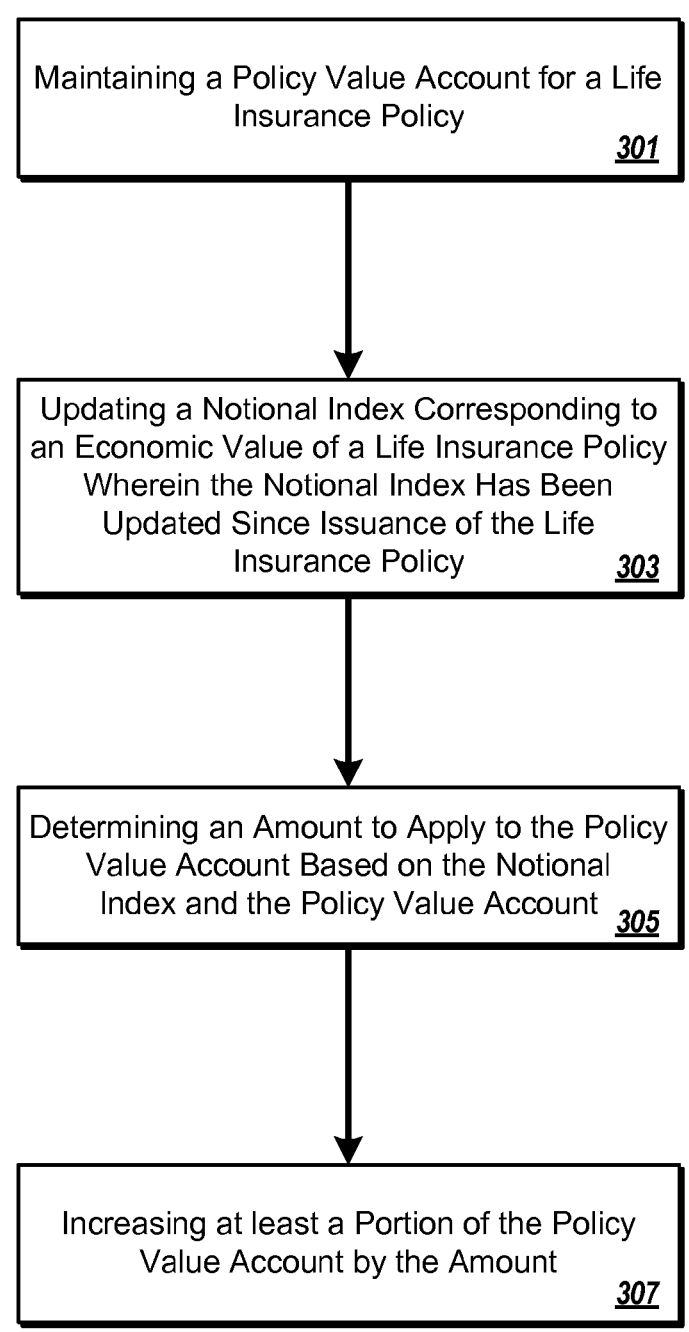

Referring now to FIG. 3, a flow diagram 300 of another example method for increasing a policy value account of a life insurance policy based on the economic value of the policy is shown and described. The method may include maintaining a policy value account for a life insurance policy (step 301). The policy may be maintained based on any of the steps described herein.

The method may include updating a notional index corresponding to an economic value of the life insurance policy, wherein the notional index has been updated since issuance of the life insurance policy (step 303). In some implementations, the notional index may be created upon issuance of the policy. In some implementations, the notional index may be created upon acquisition of the policy. The notional index may incorporate data about any factor that may impact the economic impact of the policy together with policy holder actions allowed by the policy contract. For example, the notional index may incorporate data about the size and timing of premiums paid, the overall investment rate of returns on the life insurance company's general account, the rates of return for individual investments held within the investment account, charges to be applied to the notional index (e.g., premium charges, cost of insurance charges), or any other factor described herein.

In some implementations, the notional index may be updated when updated data to be incorporated into the notional index becomes available. In some implementations, the notional index may be updated on a daily, monthly, quarterly or yearly basis. In some implementations, the notional index may be updated on an irregular basis.

The method may include determining an amount to apply to the policy value account based at least in part on the notional index and the policy value account (step 305). In some implementations, the amount may be a percentage of the difference between the notional index and the policy value account. In some implementations, the amount may be an amount to maintain a ratio between the policy value account and the notional index (e.g., 45%, 55%). In some implementations, the amount may be determined at least in part by comparing the notional index with the economic value of a theoretical policy, e.g., of a class of policies that includes the policy. The amount may be adjusted based on results of the comparison.

The method may include increasing at least a portion of the policy value account by the amount (step 307). The policy value account of a policy may be increased by the amount. In some implementations, the policy value account may be increased after an initial duration of the policy has elapsed (e.g., 5 years, 10 years, 11 years, 15 years).

Figure 4:
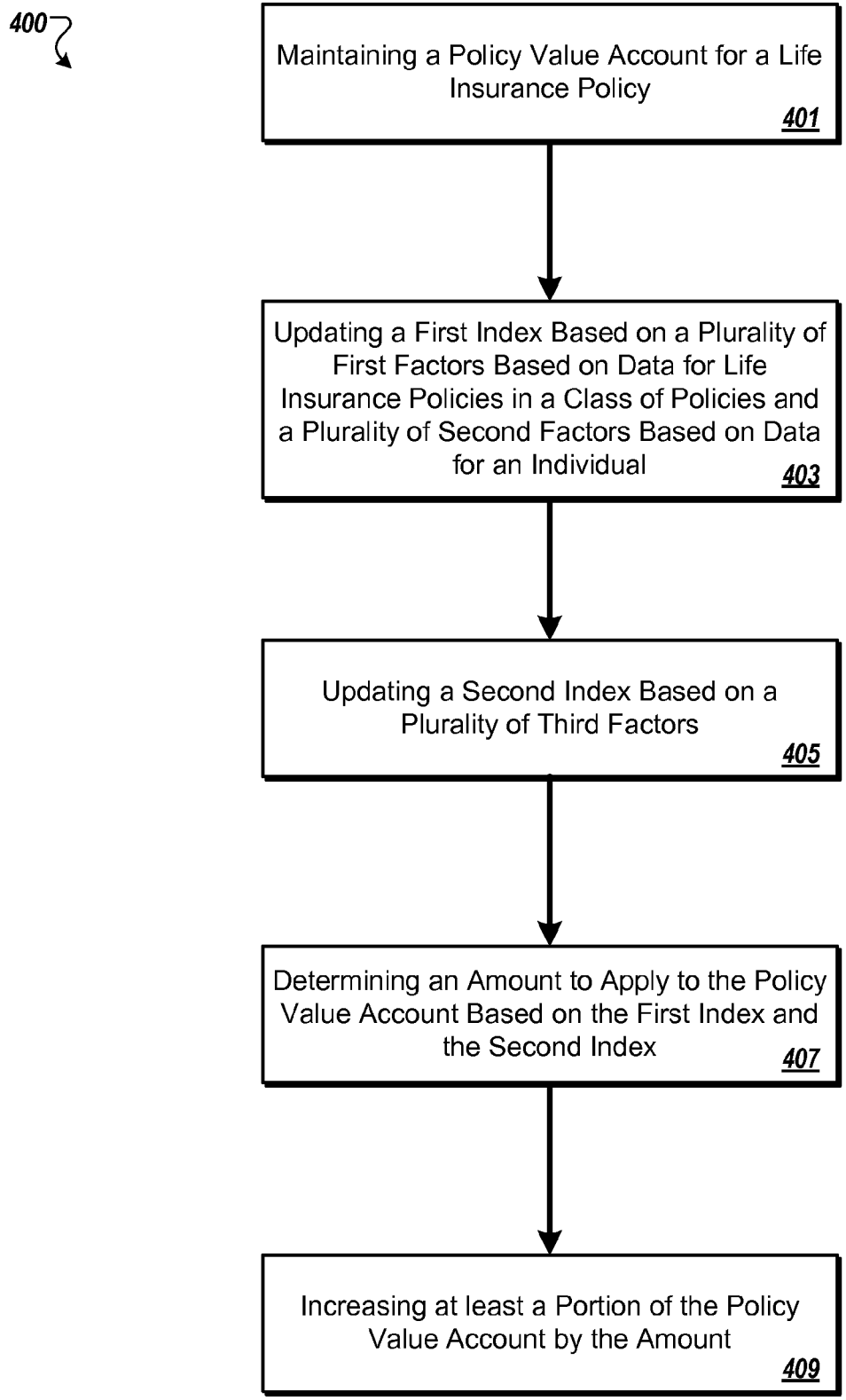

Referring now to FIG. 4, a flow diagram 400 of another example method for increasing a policy value account of a life insurance policy based on the economic value of the policy is shown and described. The method may include maintaining a policy value account for a life insurance policy (step 401). The policy may be maintained based on any of the steps described herein.

The method may include updating a first index, wherein the first index is based at least in part on a) a plurality of first factors based on data for life insurance policies in a class of policies, wherein the class of policies includes the life insurance policy, and b) a plurality of second factors based on data for an individual, wherein the individual is a policy holder of the life insurance policy (step 403). The plurality of first factors may include experience factors and/or product factors, as described herein. The plurality of second factors may include policy holder factors, as described herein. In some implementations, the first index may correspond to the notional index described herein.

The method may include updating a second index, wherein the second index is based at least in part on a plurality of third factors (step 405). In some implementations, the second index may correspond to the policy value account of the policy. In some implementations, the plurality of third factors may be equal to a subset of the plurality of second factors. For example, the second index and the first index may be updated by deducting the same premium charges from the indices. In another example, the second and first index may be updated by deducting the same expense charges from the indices.

In some implementations, the plurality of third factors may not be equal to the plurality of first factors. For example, the plurality of first factors may include a rate of persistency for the class of factors, which may not be included in the plurality of third factors. For example, the pluralities of third and first factors may include different costs of insurance factors, as may be expressed in different dollar amounts per $1000 of the net amount at risk. The pluralities of third and first factors may include different interest rates applied to the indices (e.g., investment rate of return for the general account, investment rate of return after the life insurance company has taken a spread), or any other factors.

In some implementations, the plurality of third factors may not be equal to the plurality of second factors. For example, when a policy holder repays a loan taken on the policy, the first index may be increased by the principal and interest of each repayment. In some implementations, the second index may be increased solely by the principal of each repayment. For example, when a policy holder pays a premium, the first index may be increased by a percentage of the premium. In some implementations, the second index may be increased by a different percentage of the premium. For example, a policy holder may make a partial withdrawal of the cash surrender value of his or her policy. A policy holder may decrease the face amount of the policy by an amount that requires a partial withdrawal. The first index may be decreased by the amount of the withdrawal. In some implementations, the first index may be decreased by a fee associated with the withdrawal. In some implementations, the second index may be decreased by a difference between the amount of the withdrawal multiplied by a factor, and a different fee. For example, if a policy holder adds a rider to a policy or exercises a rider benefit, the first index may be decreased by a rider charger. The second index may be decreased by a factor multiplied by the rider charge.

The method may include determining an amount to apply to the policy value account based on the first index and the second index (step 407). In some implementations, the amount may be a percentage of the difference between the indices. In some implementations, the amount may be an amount to maintain a ratio between the second index and the first index (e.g., 45%, 55%). In some implementations, the amount may be determined at least in part by comparing the first index with the economic value of a theoretical policy, e.g., of the class of policies. The amount may be adjusted based on results of the comparison.

The method may include increasing at least a portion of the policy value account by the amount (step 409). The policy value account of a policy may be increased by the amount. In some implementations, the policy value account may be increased after an initial duration of the policy has elapsed (e.g., 5 years, 10 years, 11 years, 15 years).

Figure 5:
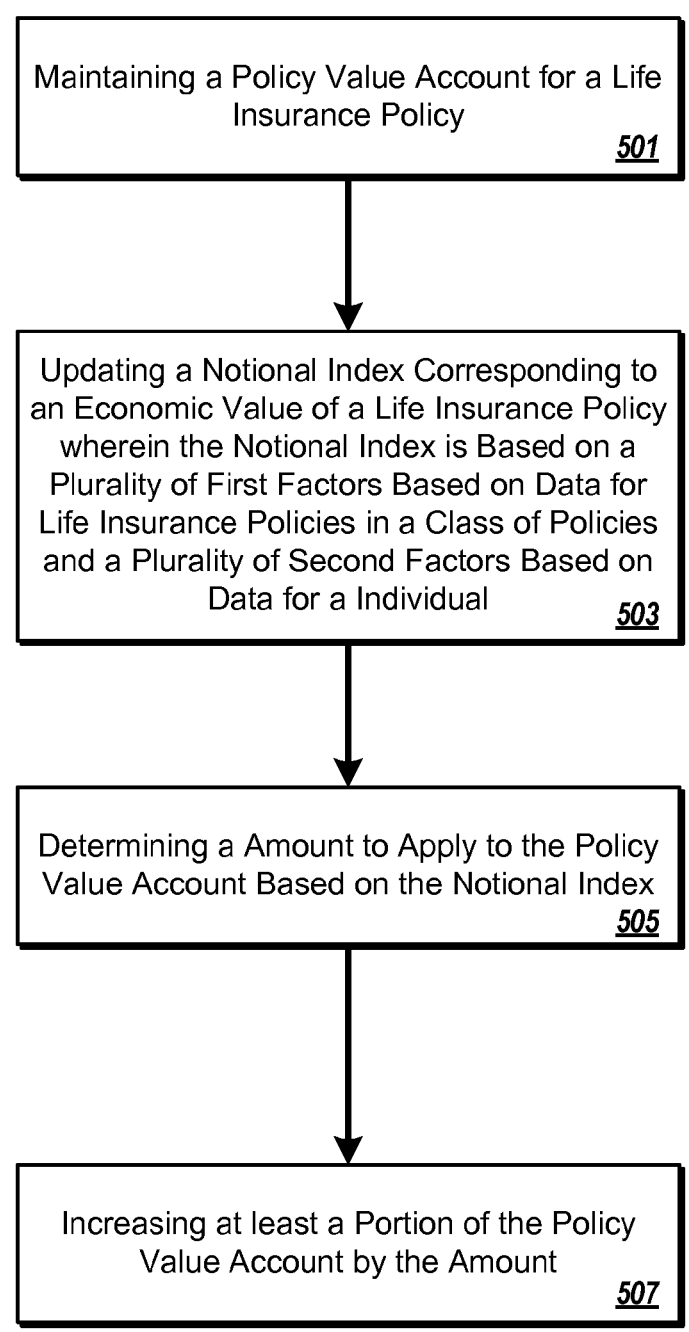

Referring now to FIG. 5, a flow diagram 500 of another example method for increasing a policy value account of a life insurance policy based on the economic value of the policy is shown and described. The method may include maintaining a policy value account for a life insurance policy (step 501). The policy may be maintained based on any of the steps described herein.

The method may include updating a notional index corresponding to an economic value of a life insurance policy (step 503). The notional index may have been updated since issuance of the life insurance policy. The notional index may be based at least in part on a plurality of first factors based on data for life insurance policies in a class of policies, wherein the class of policies includes the life insurance policy, and a plurality of second factors based on data for an individual, wherein the individual is a policy holder of the life insurance policy. The plurality of first factors may include product factors and/or experience factors, as described herein. The plurality of second factors may include policy holder factors, as described herein.

The method may include determining an amount to apply to the policy value account based at least in part on the notional index (step 505). In some implementations, the amount may be a percentage of the difference between the notional index and the policy value account. In some implementations, the amount may be an amount to maintain a ratio between the policy value account and the notional index (e.g., 45%, 55%). In some implementations, the amount may be determined at least in part by comparing the notional index with the economic value of a theoretical policy, e.g., of the class of policies. The amount may be adjusted based on results of the comparison.

The amount may be determined on a daily, monthly, quarterly, or yearly basis, although the amount may be determined at other periods of time. In some implementations, the amount may have a minimum guaranteed value. If the amount determined by any of the methods described herein is less than the minimum guaranteed value, the amount may assume the minimum guaranteed value.

The method may include increasing at least a portion of the policy value account by the amount (step 507). The policy value account of a policy may be increased by the amount. In some implementations, the policy value account may be increased after an initial duration of the policy has elapsed (e.g., 5 years, 10 years, 11 years, 15 years).

Figure 6:
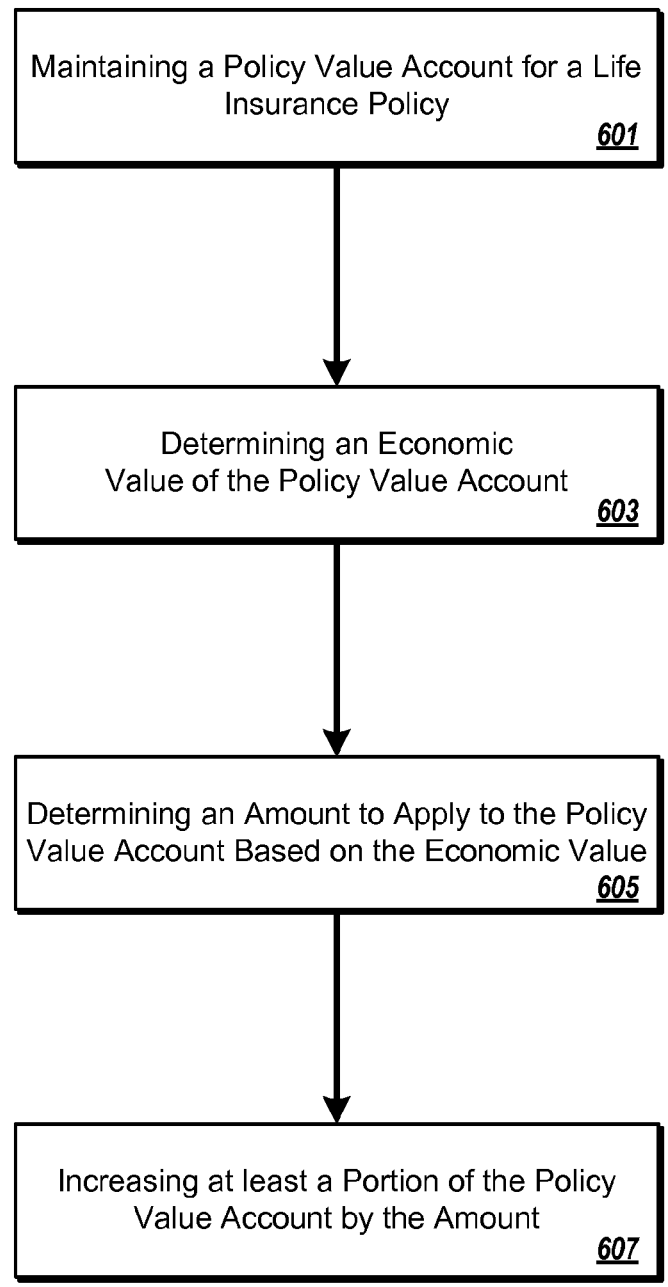

Referring now to FIG. 6, a flow diagram 600 of another example method for increasing a policy value account of a life insurance policy based on the economic value of the policy is shown and described. The method may include maintaining a policy value account for a life insurance policy (step 601). The policy may be maintained based on any of the steps described herein.

The method may include determining an economic value of the policy value account (step 603). In some implementations, a notional index may be used to determine the economic value of the policy value account. In some implementations, a notional index may be used to determine the economic value. The economic value may be determined according to, among other factors, the size and timing of the premiums paid by the policy holder, the investment rate of return for the life insurance company's general account, the rates of return for investments held by the company, the cost of insurance charges applied to a notional index or notional index, the size and timing of loans taken against the policy, or any combination thereof.

The method may include determining an amount to apply to the policy value account based on the economic value (step 605). In some implementations, the amount may be a percentage of the difference between the economic value of the policy and the policy value account. In some implementations, the amount may be an amount to maintain a ratio between the policy value account and the economic value (e.g., 45%, 55%). In some implementations, the amount may be determined at least in part by comparing the economic value of the policy with the economic value of a theoretical policy, e.g., in a class of policies that includes the policy. The amount may be adjusted based on results of the comparison.

The method may include increasing at least a portion of the policy value account by the amount (step 607). The policy value account of a policy may be increased by the amount. In some implementations, the policy value account may be increased after an initial duration of the policy has elapsed (e.g., 5 years, 10 years, 11 years, 15 years).

Figure 7:
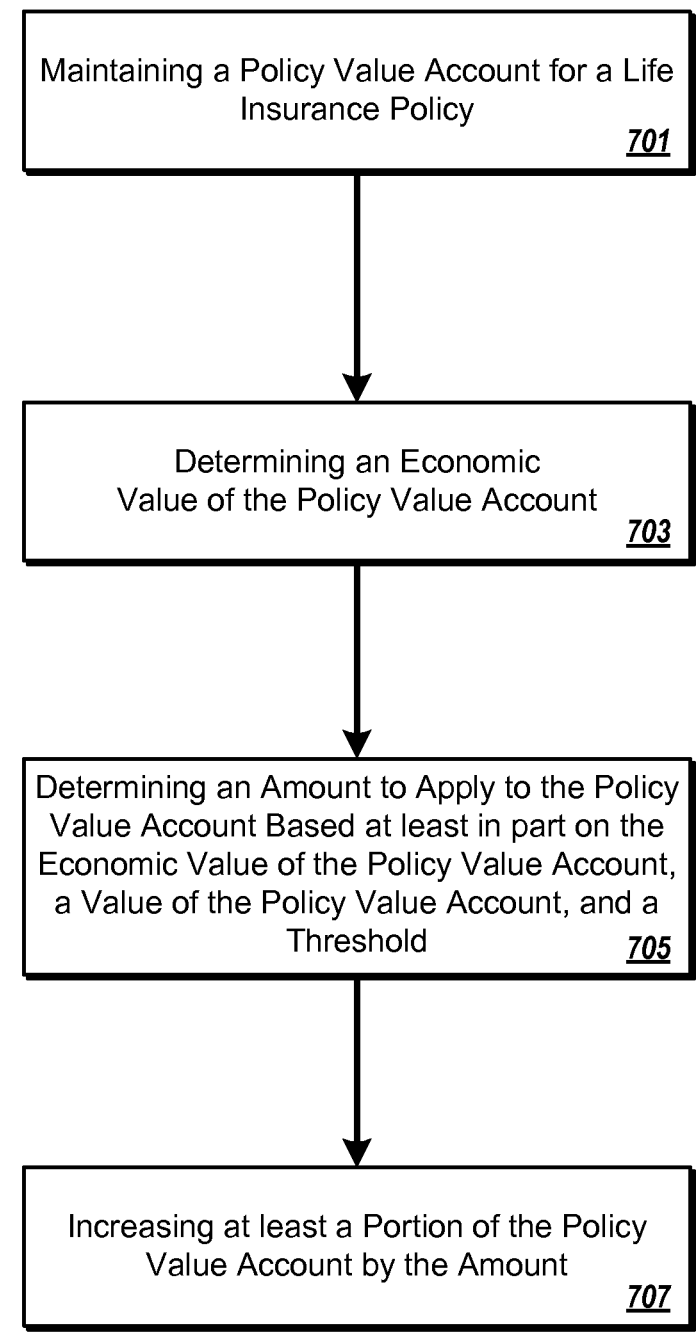

Referring now to FIG. 7, a flow diagram 700 of another example method for increasing a policy value account of a life insurance policy based on the economic value of the policy is shown and described. The method may include maintaining a policy value account for a life insurance policy (step 701). The policy may be maintained based on any of the steps described herein.

The method may include determining an economic value of the policy value account (step 703). In some implementations, a notional index may be used to determine the economic value of the policy value account. In some implementations, a notional index may be used to determine the economic value. The economic value may be determined according to, among other factors, the size and timing of the premiums paid by the policy holder, the investment rate of return for the life insurance company's general account, the rates of return for investments held by the company, the cost of insurance charges applied to a notional index or notional index, the size and timing of loans taken against the policy, or any combination thereof.

The method may include determining an amount to apply to the policy value account based at least in part on the economic value of the policy value account, a value of the policy value account, and a threshold (step 705). In some implementations, the threshold may be the economic value of a theoretical policy, e.g., of a class of policies that includes the policy. In some implementations, the economic value of the policy and threshold may be adjusted by adjustment factors r and s, respectively. The larger of the adjusted values may be subtracted from the difference between the economic value of the policy value account and the policy value account to determine the amount to apply.

The method may include increasing at least a portion of the policy value account by the amount (step 707). The policy value account of a policy may be increased by the amount. In some implementations, the policy value account may be increased after an initial duration of the policy has elapsed (e.g., 5 years, 10 years, 11 years, 15 years).

EXAMPLE 1

A life insurance policy may be issued to a man when the man is 20 years old. The man may currently be 38 years old. Thus, the policy year of the life insurance policy may be 18. The amount in the policy value account of the policy may be $14,207.75. The amount in the loan account of the policy may be $0.00 (e.g., the policy holder has not taken any loans against the policy). The value of the notional index may be $26,388.62. A minimum amount for the economic credit in the first month of the $18^{th}$ policy year may be 0.025% of the policy value account. Since the loan account is $0.00, the policy value account may be equal to the amount in the policy value account. Thus, the minimum amount for the economic credit for the first month may be 0.025*$14,207.75/100=$3.55.

A potential economic credit for the month may be determined according to a series of calculations. First, the value of the notional index may be multiplied by a policy credit ratio (e.g., 45%), and the amount of the policy value account may be subtracted from the resulting product. Thus, the value for this calculation may be ($26,388.62*0.45)−$14,207.75=−$2,332.87. Second, the hurdle adjustment (e.g., $0.00 for a 38-year-old man) and the value of the policy value account may be subtracted from the value of the notional index. Thus, the value for this calculation may be $26,388.62−$14,207.75−$0=$12,180.87. The lesser of the two calculations may be multiplied by the policy credit grading percentage (e.g., 100% for policy years larger than 15). Thus, the result of this calculation may be −$2,332.87*100/100=−$2,332.87. As this amount is smaller than the minimum amount for the economic credit, the minimum amount may be determined to be the economic credit for the month. The minimum amount may be added to the policy value account for the life insurance policy.

EXAMPLE 2

The value of the notional index for the following month may be determined by adjusting the value of the notional index from the prior month. The net premiums for the notional index, the adjustment for the notional index, and the credited interest for the notional index may be added to the value of the notional index. The monthly charges and the loan adjustment may be subtracted from the value of the notional account.

The net premiums for the notional index may be equal to the premiums the policy holder pays for the month multiplied by the premium adjustment factor (e.g., 73.08% for all policy years over 11). The policy holder may make a single payment for the entire year of the policy, $2,059.00. Thus, the net premiums may be $2,059.00*0.7308=$1,504.72.

The adjustment for the notional index may have two components. The first component of the adjustment may be equal to a first adjustment component factor multiplied by a first adjustment component basis, divided by 1,000. The first adjustment component factor may be equal to a first adjustment factor based on the life insurance policy holder's age. For example, the first adjustment factor for a 38-year-old man may be 2.192296, as demonstrated in the table of FIG. 8 (e.g., "Policy Credit Measure Adjustment Factor A"). If the cost of insurance charge for the notional index is greater than 0, a second adjustment factor based on the life insurance policy holder's age may be added to the first adjustment component factor. The cost of insurance charge for a 38-year-old man may be 0.1075, as demonstrated in the table of FIG. 9 (e.g., "Maximum Monthly Policy Credit Measure Cost of Insurance Rates"). As the cost of insurance charge is greater than 0, the second adjustment factor of 0.003498, as determined in the table of FIG. 8 (e.g., "Policy Credit Measure Adjustment Factor B"), may be added to the first adjustment factor of 2.192296 to attain a first adjustment component factor of 2.195794.

The first adjustment component basis also includes two components. The first component is the lesser of the face amount of the life insurance policy and the value of the notional index. The face amount of the life insurance policy may be $1,000,000.00. The value of the notional index may be $26,510.44. Thus, the lesser value is $26,510.44.

The second component is the greater of the cash surrender value of the policy or the product of the policy credit ratio (e.g., 45%), the policy credit grading percentage (e.g., 100% for policy years over 15), and the value of the notional index. In this context, the cash surrender value of the policy may be the difference between policy value account of the policy after net premiums have been added, after monthly charges have been subtracted, and before any economic credits have been added, and the surrender charge. The policy value account of the policy may be $14,133.66.

The surrender charge in the 18$^{th}$ policy year may be 15% of a calculated surrender charge, as determined by reference to a table such as the table FIG. 10 (e.g., "Maximum Percentage of Surrender Charge"). The calculated surrender charge may be the difference between 2% of the lesser of $2,337.60 and the sum of premiums paid in the first policy year (since the premium in this example is paid on a yearly basis), and $494.84. As $2,059.00 is the smaller amount, the amount to subtract from $494.84 may be $41.18. Thus, the calculated surrender charge may be $494.84−$41.18=$453.66. 15% of this calculated surrender charge produces a surrender charge in the 18$^{th}$ policy year of $68.05.

The cash surrender value of the policy is $14,133.66−$68.05=$14,065.61. The product of the policy credit ratio (e.g., 45%), the policy credit grading percentage (e.g., 100% for policy years over 15), and the value of the notional index (e.g., $26,510.44) is $11,929.70. Thus, the greater of the two values is the cash surrender value of $14,065.61.

The difference between the value of the notional index ($26,510.44) and the cash surrender value ($14,065.61) is $12,444.83, which is the first adjustment component basis. The first adjustment component basis multiplied by the first adjustment component factor of 2.195794 and divided by 1000 is $27.33.

The second component of the adjustment may be equal to a second adjustment component factor multiplied by a second adjustment component basis, divided by 1,000. The second adjustment component factor may be equal to a first adjustment factor based on the life insurance policy holder's age. For example, the second adjustment factor for a 38-year-old man may be −0.963750, as demonstrated in the table of FIG. 11 (e.g., "Policy Credit Measure Adjustment Factor C").

The second adjustment component basis may be the difference between the value of the notional index ($26,510.44) and the product of the face amount ($1,000,000) and a second adjustment factor based on the life insurance policy holder's age. For example, the second adjustment factor for a 38-year-old man may be 0.008017, as demonstrated in the table of FIG. 11 (e.g., "Policy Credit Measure Adjustment Factor D"). Thus, the second adjustment component basis may be $26,510.44−($1,000,000*0.008017)=$18,493.44. The second adjustment factor of −0.963750 multiplied by the second adjustment component basis of $18,493.44, divided by 1000, is −$17.82. Thus, as the sum of the two components of $27.33 and −$17.82, the adjustment for the notional index may be $9.51.

The credited interest for the notional index may be an interest rate applied to the value of the notional index ($26,510.44). For example, the interest rate may be a guaranteed minimum interest rate (e.g., 2.5%). A yearly interest rate of 2.5% applied to $26,510.44 for a month may be $55.23.

The monthly charges and the loan adjustment may be subtracted from the value of the notional index. The monthly charges may include a notional index administrative charge (e.g., $15.00), a notional index contract charge (e.g., $0.1943 per $1000 of the policy's face amount for the first 5 policy years, but 0 thereafter), and a cost of insurance charge.

The cost of insurance charge may be a product of a maximum monthly cost of insurance rate specific to the age of the policy holder and the net amount at risk for the life insurance policy. For example, the cost of insurance rate for a 38-year-old man may be $0.107500 per $1000 of the policy's net amount at risk, as demonstrated in the table of FIG. 9 (e.g., "Maximum Monthly Policy Credit Measure Cost of Insurance Rates"). The net amount at risk is the difference between the value of the notional index ($26,510.44) and the larger of the face amount of the policy divided by the death benefit discount factor (e.g., 1.0020598) or the minimum death benefit for the policy. The face amount of the policy (e.g., $1,000,000) divided by the death benefit discount factor is $997,944.43.

The minimum death benefit for the policy is the lesser of two calculations. The first calculation compares the policy value account of the policy ($14,133.66), the value of the notional index ($26,510.44) multiplied by the policy credit ratio (e.g., 45%), and the cash surrender value ($14,065.61). The largest of the three values is $14,133.66, and this value is multiplied by a first minimum death benefit factor associated with the age of the life insurance policy holder. The factor for a 38-year-old man may be 10.5042, as demonstrated in the table of FIG. 12 (e.g., "Minimum Death Benefit Factor A"). Thus, the first calculation is $14,133.66*10.5042=$148,462.79.

The second calculation compares the policy value account of the policy ($14,133.66), the value of the notional index ($26,510.44), and the cash surrender value ($14,065.61). The largest of the three values is $26,510.44, and this value is multiplied by a second minimum death benefit factor associated with the age of the life insurance policy holder. The factor for a 38-year-old man may be 4.7730, as demonstrated in the table of FIG. 12 (e.g., "Minimum Death Benefit Factor B"). Thus, the second calculation is $26,510.44*4.7730=$126,534.33. As the second calculation is smaller than the first calculation, the minimum death benefit for the policy is $126,534.33.

The net amount at risk is the difference between the value of the notional index and the larger of the face amount of the policy divided by the death benefit discount factor (e.g., 1.0020598) or the minimum death benefit for the policy. The face amount of the policy (e.g., $1,000,000) divided by the death benefit discount factor is $997,944.43, which is larger than the minimum death benefit of $126,534.33. As the value of the notional index is $26,510.44, the net amount at risk is $997,944.43-$26,510.44=$971,433.99.

As the cost of insurance charge may be a product of the net amount at risk and the maximum monthly cost of insurance rate specific to the age of the policy holder ($0.107500 per $1000 of the policy's face amount), the cost of insurance charge may be $971,433.99*0.107500/1000=$104.43.

Adjustments to the value of the notional index ($26,510.44) may be made to determine the value of the notional index for the following month. The net premiums for the notional index ($1,504.72), the adjustment for the notional index ($9.51), and the credited interest for the notional index ($55.23) may be added to the value of the notional index. The monthly charges (e.g., notional index administrative charge of $15.00) and a cost of insurance charge ($157.96) may be subtracted from the value of the notional index. Thus, the value of the notional index for a following month may be $26,510.44+$1,504.72+$9.51+$55.23-$15.00-$104.43=$27,910.47.

EXAMPLE 3

A life insurance policy may be issued to a man when the man is 20 years old. The man may currently be 63 years old. Thus, the policy year of the life insurance policy may be 43. The amount in the policy value account of the policy may be $85,743.47. The amount in the loan account of the policy may be $0.00 (e.g., the policy holder has not taken any loans against the policy). The value of the notional index may be $190,794.28. A minimum amount for the economic credit in the first month of the 43$^{rd}$ policy year may be 0.025% of the policy value account. Since the loan account is $0.00, the policy value account may be equal to the amount in the policy value account. Thus, the minimum amount for the economic credit for the first month may be 0.025*$85,743.47/100=$21.44.

A potential economic credit for the month may be determined according to a series of calculations. First, the value of the notional index may be multiplied by a policy credit ratio (e.g., 45%), and the amount of the policy value account may be subtracted from the product. Thus, the value for this calculation may be ($190,794.28*0.45)-$85,743.47=$113.95. Second, the hurdle adjustment (e.g., $0.00 for a 63-year-old man) and the amount of the policy value account may be subtracted from the value of the notional index. Thus, the value for this calculation may be $190,794.28-$85,743.47-$0=$105,050.81. The lesser of the two calculations may be multiplied by the policy credit grading percentage (e.g., 100% for policy years larger than 15). Thus, the result of this calculation may be $113.95*100/100=$113.95. As this amount is greater than the minimum amount for the economic credit, it may be determined to be the economic credit for the month and it may be added to the policy value account for the life insurance policy.

EXAMPLE 4

The value of the notional index for the following month may be determined by adjusting the value of the notional index from the prior month. The net premiums for the notional index, the adjustment for the notional index, and the credited interest for the notional index may be added to the value of the notional index. The monthly charges and the loan adjustment may be subtracted from the value of the notional index.

The net premiums for the notional index may be equal to the premiums the policy holder pays for the month multiplied by the premium adjustment factor (e.g., 73.08% for all policy years over 11). The policy holder may make a single payment for the entire year of the policy, $2,059.00. Thus, the net premiums may be $2,059.00*0.7308=$1,504.72.

The adjustment for the notional index may have two components. The first component of the adjustment may be equal to a first adjustment component factor multiplied by a first adjustment component basis, divided by 1,000. The first adjustment component factor may be equal to a first adjustment factor based on the life insurance policy holder's age. For example, the first adjustment factor for a 63-year-old man may be 1.646907, as demonstrated in the table of FIG. 8 (e.g., "Policy Credit Measure Adjustment Factor A"). If the cost of insurance charge for the notional index is greater than 0, a second adjustment factor based on the life insurance policy holder's age may be added to the first adjustment component factor. The cost of insurance charge for a 63-year-old man may be 0.8388, as demonstrated in the table of FIG. 9 (e.g., "Maximum Monthly Policy Credit Measure Cost of Insurance Rates"). As the cost of insurance charge is greater than 0, the second adjustment factor of -0.065864, as determined in the table of FIG. 8 (e.g., "Policy Credit Measure Adjustment Factor B"), may be added to the first adjustment factor of 1.646907 to attain a first adjustment component factor of 1.581043.

The first adjustment component basis also includes two components. The first component is the lesser of the face amount of the life insurance policy and the value of the notional index. The face amount of the life insurance policy may be $1,000,000.00. The value of the notional index may be $190,794.28. Thus, the lesser value is $190,794.28.

The second component is the greater of the cash surrender value of the policy or the product of the policy credit ratio (e.g., 45%), the policy credit grading percentage (e.g., 100% for policy years over 15), and the value of the notional index ($190,794.28). In this context, the cash surrender value of the policy may be the difference between policy value account of the policy after net premiums have been added, after monthly charges have been subtracted, and before any economic credits have been added, and the surrender charge. The policy value account of the policy may be $85,743.47.

The surrender charge in the 43$^{rd}$ policy year may be 0% of a calculated surrender charge, as determined by reference to a table such as the table FIG. 10 (e.g., "Maximum Percentage of Surrender Charge"). Thus, the surrender charge may be $0, reflecting that the initial cost of issuing a life insurance policy has been amortized.

The cash surrender value of the policy is equal to the policy value account of the policy, i.e., $85,743.47. The product of the policy credit ratio (e.g., 45%), the policy credit grading percentage (e.g., 100% for policy years over 15), and the value of the notional index (e.g., $190,794.28) is $85,857.43. Thus, the greater of the two values is the product, at $85,857.43.

The difference between the value of the notional index ($190,794.28) and the cash surrender value ($85,743.47) is $104,936.85, which is the first adjustment component basis. The first adjustment component basis multiplied by the first adjustment component factor of 1.581043 and divided by 1000 is $165.91.

The second component of the adjustment may be equal to a second adjustment component factor multiplied by a second adjustment component basis, divided by 1,000. The second adjustment component factor may be equal to a first adjustment factor based on the life insurance policy holder's age. For example, the second adjustment factor for a 63-year-old man may be 0.00, as demonstrated in the table of FIG. 11 (e.g., "Policy Credit Measure Adjustment Factor C").

The second adjustment component basis may be the difference between the value of the notional index ($190,794.28) and the product of the face amount ($1,000,000) and a second adjustment factor based on the life insurance policy holder's age. For example, the second adjustment factor for a 63-year-old man may be 0.182437, as demonstrated in the table of FIG. 11 (e.g., "Policy Credit Measure Adjustment Factor D"). Thus, the second adjustment component basis may be $190,794.28−($1,000,000*0.182437)=$8,357.28. The second adjustment factor of 0.00 multiplied by the second adjustment component basis of $8,357.28, divided by 1000, is $0.00. Thus, as the sum of the two components of $165.91 and $0.00, the adjustment for the notional index may be $165.91.

The credited interest for the notional index may be an interest rate applied to the value of the notional index ($190,794.28). For example, the interest rate may be a guaranteed minimum interest rate (e.g., 2.5%). A yearly interest rate of 2.5% applied to $190,794.28 for a month may be $397.49.

The monthly charges and the loan adjustment may be subtracted from the value of the notional index. The monthly charges may include a notional index administrative charge (e.g., $15.00), a notional index contract charge (e.g., $0.1943 per $1000 of the policy's face amount for the first 5 policy years, but 0 thereafter), and a cost of insurance charge.

The cost of insurance charge may be a product of a maximum monthly cost of insurance rate specific to the age of the policy holder and the net amount at risk for the life insurance policy. For example, the cost of insurance rate for a 63-year-old man may be $0.83880 per $1000 of the policy's net amount at risk, as demonstrated in the table of FIG. 9 (e.g., "Maximum Monthly Policy Credit Measure Cost of Insurance Rates"). The net amount at risk is the difference between the value of the notional index ($190,794.28) and the larger of the face amount of the policy divided by the death benefit discount factor (e.g., 1.0020598) or the minimum death benefit for the policy. The face amount of the policy (e.g., $1,000,000) divided by the death benefit discount factor is $997,944.43.

The minimum death benefit for the policy is the lesser of two calculations. The first calculation compares the policy value account of the policy ($85,743.47), the value of the notional index ($190,794.28) multiplied by the policy credit ratio (e.g., 45%), and the cash surrender value ($85,743.47). The largest of the three values is the product of the value of the notional index ($190,794.28) and the policy credit ratio (e.g., 45%), or $85,857.43. This value is multiplied by a first minimum death benefit factor associated with the age of the life insurance policy holder. The factor for a 63-year-old man may be 4.5937, as demonstrated in the table of FIG. 12 (e.g., "Minimum Death Benefit Factor A"). Thus, the first calculation is $85,857.43*4.5937=$394,403.28.

The second calculation compares the policy value account of the policy ($85,743.47), the value of the notional index ($190,794.28), and the cash surrender value ($85,743.47). The largest of the three values is $190,794.28, and this value is multiplied by a second minimum death benefit factor associated with the age of the life insurance policy holder. The factor for a 63-year-old man may be 2.0929, as demonstrated in the table of FIG. 12 (e.g., "Minimum Death Benefit Factor B"). Thus, the second calculation is $190,794.28*2.0929=$399,313.35. As the first calculation is smaller than the second calculation, the minimum death benefit for the policy is $394,403.28.

The net amount at risk is the difference between the value of the notional index and the larger of the face amount of the policy divided by the death benefit discount factor (e.g., 1.0020598) or the minimum death benefit for the policy. The face amount of the policy (e.g., $1,000,000) divided by the death benefit discount factor is $997,944.43, which is larger than the minimum death benefit of $394,403.28. As the value of the notional index is $190,794.28, the net amount at risk is $997,944.43−$190,794.28=$807,150.15.

As the cost of insurance charge may be a product of the net amount at risk and the maximum monthly cost of insurance rate specific to the age of the policy holder ($0.83880 per $1000 of the policy's face amount, as demonstrated in the table of FIG. 9 in e.g., "Maximum Monthly Policy Credit Measure Cost of Insurance Rates"), the cost of insurance charge may be $807,150.15*0.83880/1000=$677.04.

Adjustments to the value of the notional index ($190,794.28) may be made to determine the value of the notional index for the following month. The net premiums for the notional index ($1,504.72), the adjustment for the notional index ($165.91), and the credited interest for the notional index ($397.49) may be added to the value of the notional index. The monthly charges (e.g., notional index administrative charge of $15.00) and a cost of insurance charge ($677.04) may be subtracted from the value of the notional index. Thus, the value of the notional index for a following month may be $190,794.28+$1,504.72+$165.91+$397.49−$15.00−$677.04=$192,170.36.

An Example System for Determining the Economic Credit

Figure 13:
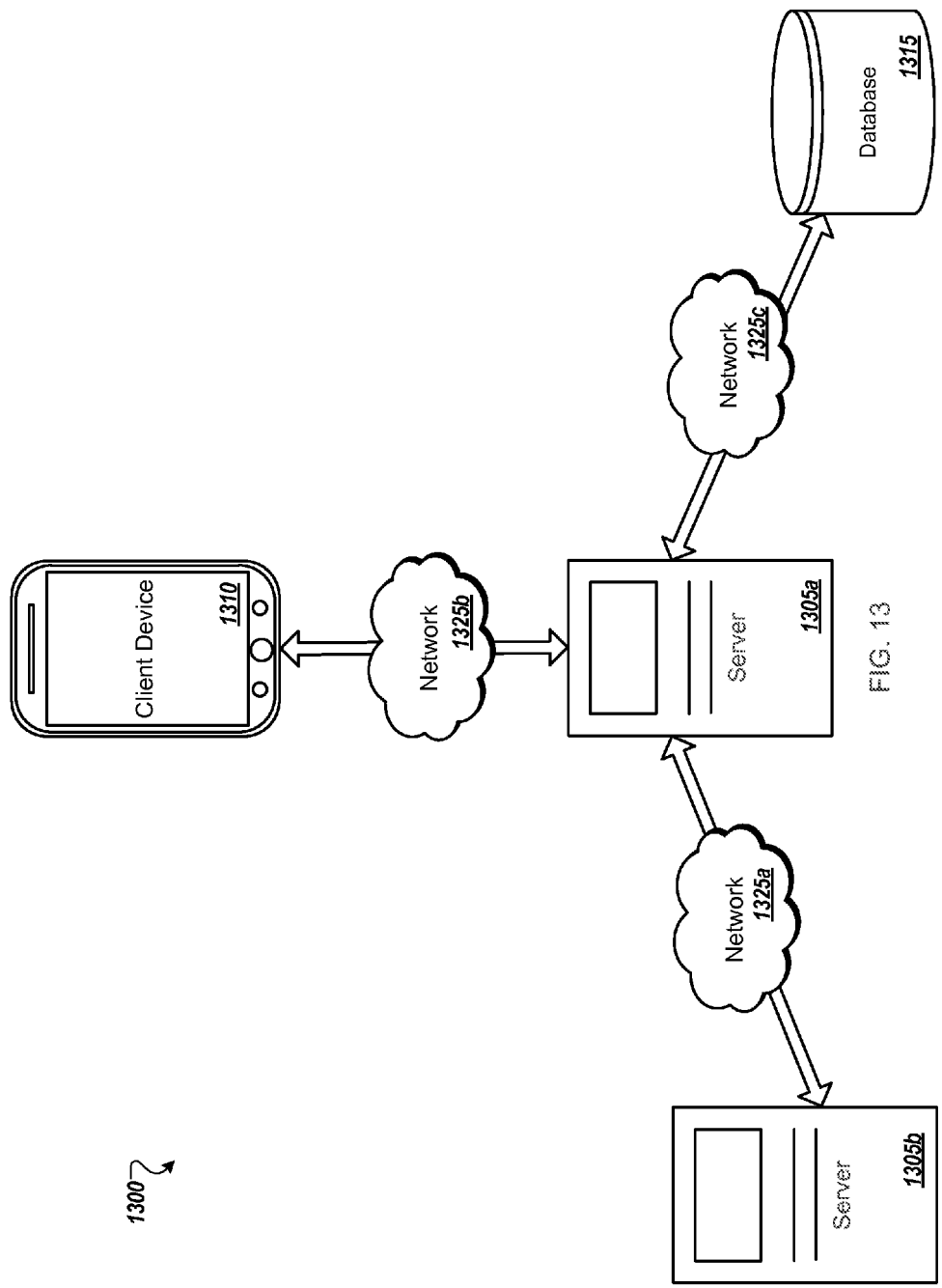
FIG. 13 is an example system for increasing a policy value account of a life insurance policy based on an economic value of the policy.

Referring now to FIG. 13, an example system 1300 for implementing any of the steps described herein is shown and described. The system 1300 may include servers 1305 in communication with client devices 1310 and/or databases 1315. The databases 1315 may store information about life insurance policies for retrieval by the servers 1305. In some implementations, the servers 1305 may store information about life insurance policies on their internal caches. In some implementations, the servers 1305, client devices 1310, and databases 1315 may be connected over networks 1325. The client devices 1310 may include mobile and/or wireless devices.

In some implementations, a server 1305a may receive updated data about a life insurance policy from a client device 1310 or another server 1305b. The server 1305a may receive information about the policy (e.g., policy value account, notional index, product factors, experience factors, policy holder factors) from an internal cache, a database 1315, or another server 1305b. The server 1305a may update the policy value account and/or notional index based on the updated data. The server 1305a may determine an economic credit for increasing the policy value account based on the updated data. The server 1305a may transmit the information about the policy to the database 1315 or another server 1305b for storage therein.

The systems, software, and methods described herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired. In any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

An example of one such type of computer is shown in FIG. 14, which shows a block diagram of a programmable processing system (system) 1411 suitable for implementing or performing the apparatus or methods described herein. The system 1411 includes a processor 1420, a random access memory (RAM) 1421, a program memory 1422 (for example, a writeable read-only memory (ROM) such as a flash ROM), a hard drive controller 1423, and an input/output (I/O) controller 1424 coupled by a processor (CPU) bus 1425. The system 1411 can be preprogrammed, in ROM, for example, or it can be programmed (and reprogrammed) by loading a program from another source (for example, from a floppy disk, a CD-ROM, or another computer).

The hard drive controller 1423 is coupled to a hard disk 1430 suitable for storing executable computer programs, including programs embodying the present methods, and data including storage. The I/O controller 1424 is coupled by an I/O bus 1426 to an I/O interface 1427. The I/O interface 1427 receives and transmits data in analog or digital form over communication links such as a serial link, local area network, wireless link, and parallel link.

The implementations described herein may be used in different computing and networking environments and architectures, such as cloud computing environments and architecture, software-as-a-service (SaaS), etc.

Elements of different implementations described herein may be combined to form other implementations not specifically set forth above. Other implementations not specifically described herein are also within the scope of the following claims.

Advantages of the Economic Credit

Advantageously, in some implementations, the economic credit and/or notional index described herein may present larger interest credits to policy holders whose premium payment practices correspond to an increase in the economic value of the life insurance company's assets. These holders' practices may provide life insurance companies with steadier, more reliable, and/or larger amounts of assets, which may enable life insurance companies to make different, more profitable, investment decisions.

Advantageously, in some implementations, the economic credit and/or notional index may enable life insurance companies to adopt more aggressive investment strategies. Through the notional index, a life insurance company may pass aggregate returns, both positive and negative, to policy holders. Since the economic credit is substantially a separate addition to a policy holder's policy value account, the variations in the credit may cushion the life insurance company from the financial consequences of short-term fluctuations in investment returns. For example, if the expected return from an investment drops, the crediting rate for the notional index and future economic credits may decline, resulting in a corresponding decrease in reserves to offset the asset loss.

Thus, in some implementations, the notional index may at least partially absorb the financial effects of investment results. Such absorption may provide life insurance companies the flexibility to pursue investments with higher long-term returns, but less predictable short-term returns (e.g., real estate, 30-year bonds, mutual funds targeting small capitalization companies, mutual funds targeting developing nations). Further, some life insurance policies that use the notional index may be structured so that their benefits are supported by asset accounts with decreased levels of liquidity. For these accounts, companies may use the illiquidity to mutual advantage by investing in assets thus described.

Advantageously, in some implementations, the economic credit and/or notional index may decrease charges applied to policy holders that may be associated with investment risk. Since life insurance companies may pass some of the investment risks to policy holders via the notional index, the companies may find other risk charges unnecessary or inappropriate. Thus, the notional index may result in the elimination of certain other charges, which may increase the policy value accounts.

Advantageously, in some implementations, the economic credit and/or notional index may lower the total size of required premiums. When a life insurance company may pursue longer term investments with higher rates of return, the resulting investment returns may result in smaller premium requirements to keep the policy in force. In contrast, companies that are limited to short-term investments with lower and more stable rates of return may require higher premiums to support the same level of policy benefits.

Advantageously, in some implementations, the economic credit and/or notional index may lower the total charges applied to policies. As discussed herein, the cost of insurance charge may be a dollar amount per $1000 of the net amount at risk, which may be the difference between the policy's death benefit and policy value account. With the higher returns from long-term investments, the policy value account may increase, thereby decreasing the net amount at risk. The cost of insurance charge applied to the smaller net amount at risk may result in a lower cost of insurance charge.

Advantageously, in some implementations, the economic credit and/or notional index may enable life insurance companies to post smaller liabilities, required capital, and/or reserves on their balance sheet (e.g., expected amounts for death benefit payments, amounts for unexpected death benefit payments, amounts for adverse deviation) than would otherwise be posted. While assets supporting the cash surrender value may require a high level of liquidity, those backing the excess of the reserves over the cash surrender value may not need as high a level of liquidity. Since life insurance companies may pass some of the investment risks to policy holders via the notional index, the companies may not need to lower their earnings for any resulting investment losses. Thus, companies may reduce their liability requirements and thus reduce a source of fluctuation in earnings.

Some, all or none of these and other advantages may be realized by, or may otherwise apply to, certain implementations of the economic credit.

Uses of the Notional Index and/or Economic Credit

In some implementations, a life insurance company may consider the economic credit as a factor in determining the size of a dividend to pay to participating life insurance policies. In some implementations, the economic credit may be computed using experience factors based on historical data without projections.

Although in some implementations the notional index described herein may be used to return economic value to the policy holder, other uses of the notional index may be contemplated. For example, in some implementations, a life insurance company may use the notional index to determine whether a policy should be allowed to lapse. If a policy holder does not continue paying premiums, the policy value account may decrease as the company continues to deduct the cost of coverage. The policy value account may decrease to substantially zero (0). In some implementations, a notional index may indicate that the policy that does not have any value in its policy value account still has contractual value available to support policy benefits. In some implementations, the life insurance company may maintain a policy that continues to have contractual value, according to the notional index, even if the policy value account is zero (0) or negative. In some implementations, the life insurance company may lapse a policy if the notional index becomes zero (0) or negative, while the policy value account is not positive.

In another example, in some implementations, a life insurance company may use the notional index to determine additional benefits for the policy holder. For example, in some implementations, the life insurance company may increase the death benefit of the policy based on the notional index.

As used herein, "based on" means "based at least in part on."

While various implementations of the methods and systems have been described, these implementations are examples and in no way limit the scope of the described methods or systems. Those having skill in the relevant art may effect changes to form and details of the described methods and systems without departing from the broadest scope of the described methods and systems. Thus, the scope of the methods and systems described herein should not be limited by any of the example implementations.

What is claimed is:

1. A method for maintaining a value of a life insurance policy comprising a policy value account and an associated death benefit, the method comprising:
   determining, by a processor of a computer, a first cash value of a policy account;
   determining, by the processor, a first value of a death benefit associated with the life insurance policy, wherein:
      the death benefit represents an amount paid to a designated beneficiary of the life insurance policy upon the death of an individual that is the policy holder of the life insurance policy, and
      a value of the insurance policy is based at least in part on the first value of the death benefit and the first cash value of the policy value account;
   determining, by the processor, a change in the value of the life insurance policy,
      wherein the change in value is based at least in part on:
      i) a plurality of first factors based on data for life insurance policies in a class of policies, wherein the class of policies comprises the life insurance policy, and
      ii) a plurality of second factors based on data for the individual that is the policy holder of the life insurance policy;
   determining, by the processor, a first portion of the change in value of the life insurance policy to distribute to the policy value account;
   increasing, by the processor, the first value of the policy value account by the first portion;
   determining, by the processor, a second portion of the change in value of the life insurance policy to distribute now or in the future to pay for the death benefit; and
   increasing, by the processor, the first value of the death benefit by an amount based at least in part on the amount of death benefit that could be paid for by the second portion.

2. The method of claim 1, wherein the plurality of first factors comprises a plurality of product factors and a plurality of experience factors.

3. The method of claim 1, wherein determining the change in value of the life insurance policy further comprises:
   determining the change in value of the life insurance policy based at least in part on an economic value of the life insurance policy.

4. The method of claim 1, wherein determining the change in value of the life insurance policy further comprises:
   adjusting a product factor of the plurality of product factors based on at least one experience factor of the plurality of experience factors.

5. The method of claim 1, wherein determining the change in value of the life insurance policy further comprises:
   adjusting an experience factor of the plurality of experience factors based on at least one action of the plurality of actions of the holder.

6. The method of claim 1, wherein determining the change in value of the life insurance policy further comprises:
   adjusting an experience factor of the plurality of experience factors based on a projected value for the experience factor.

7. The method of claim 1, wherein determining the change in value of the life insurance policy further comprises:
   determining the change in value of the life insurance policy one or more months after issuance of the life insurance policy.

8. The method of claim 1, wherein determining the amount further comprises:
   determining the change in value of the life insurance policy on a daily, monthly, or annual basis.

9. The method of claim 1, wherein determining the change in value of the life insurance policy further comprises:
   determining the change in value of the life insurance policy on an irregular basis.

10. The method of claim 1, wherein determining the change in value of the life insurance policy further comprises:
   determining that the change in value of the life insurance policy falls below a threshold, and
   increasing the value of the policy value account by the threshold amount.

11. The method of claim 1, wherein determining the change in value of the life insurance policy further comprises:
   determining that the change in value of the life insurance policy is above a threshold, and
   increasing the value of the policy value account by the threshold amount.

12. The method of claim 1, wherein increasing the policy value account further comprises:
   adding the change in value of the life insurance policy to the policy value account associated with the life insurance policy, wherein the life insurance policy is a universal life insurance policy.

13. The method of claim 1, wherein increasing the policy value account further comprises:
   adding the change in value of the life insurance policy to the policy value account associated with the life insurance policy, wherein the life insurance policy is a variable life insurance policy.

14. The method of claim 1, wherein increasing the policy value account further comprises:
   adding the change in value of the life insurance policy a period of time after issuance of the life insurance policy.

15. A method for maintaining the value of a life insurance policy comprising a policy value account and an associated death benefit, the method comprising:
   determining, by a processor of a computer, a first cash value of a policy value account;
   determining, by the processor, a first value of a death benefit associated with the life insurance policy, wherein:
      the death benefit represents an amount paid to a designated beneficiary of the life insurance policy upon the death of an individual that is the policy holder of the life insurance policy, and
      a value of the life insurance policy is based at least in part on the first value of the death benefit and the first cash value of the policy value account;
   determining, by the processor, a notional index corresponding to an economic value of the life insurance policy, wherein the notional index has been updated since issuance of the life insurance policy;
   determining, by the processor, a change in value of the life insurance policy based at least in part on the notional index and the policy value account;
   determining, by the processor, a first portion of the change in value of the life insurance policy to distribute to the policy value account;
   increasing, by the processor, the first value of the policy value account by the first portion;
   determining, by the processor, a second portion of the change in value of the life insurance policy to distribute now or in the future to pay for the death benefit; and
   increasing, by the processor, the first value of the death benefit by an amount based at least in part on the amount of death benefit that could be paid by the second portion.

16. The method of claim 15, wherein the notional index has been periodically updated since issuance of the life insurance policy.

17. The method of claim 15, wherein determining the change in value of the life insurance policy further comprises:
   determining the change in value of the life insurance policy based at least in part on a value of the policy value account.

18. The method of claim 15, wherein determining the change in value of the life insurance policy further comprises:
   determining the change in value of the life insurance policy based at least in part on a difference between the notional index and the value of the policy value account.

19. A non-transitory computer readable medium storing instructions thereon, wherein the instructions, when executed, cause a processor to maintain a value of a life insurance policy comprising a policy value account and an associated death benefit by:
   determining a first cash value of a policy value account;
   determining a first value of a death benefit associated with the life insurance policy, wherein:
      the death benefit represents an amount paid to a designated beneficiary of the life insurance policy upon the death of an individual that is the policy holder of the life insurance policy, and
      a value of the life insurance policy is based at least in part on the first value of the death benefit and the first cash value of the policy value account;
   determining a change in the value of the life insurance policy, wherein the change in value is based at least in part on:
      i) a plurality of first factors based on data for life insurance policies in a class of policies, wherein the class of policies comprises the life insurance policy, and
      ii) a plurality of second factors based on data for the individual that is the policy holder of the life insurance policy;
   determining a first portion of the change in value of the life insurance policy to distribute to the policy value account;
   increasing the first value of the policy value account by the first portion;
   determining a second portion of the change in value of the life insurance policy to distribute now or in the future to pay for the death benefit; and
   increasing the first value of the death benefit by an amount based at least in part on the amount of death benefit that could be paid for by the second portion.

20. A non-transitory computer readable medium storing instructions thereon, wherein the instructions, when executed, cause a processor to maintain a value of a life insurance policy comprising a policy value account and an associated death benefit by:
   determining a first cash value of a policy value account;
   determining a first value of a death benefit associated with the life insurance policy, wherein:
      the death benefit represents an amount paid to a designated beneficiary of the life insurance policy upon the death of an individual that is the policy holder of the life insurance policy, and
      a value of the life insurance policy is based at least in part on the first value of the death benefit and the first cash value of the policy value account;

determining a notional index corresponding to an economic value of the life insurance policy, wherein the notional index has been updated since issuance of the life insurance policy;

determining a change in value of the life insurance policy based at least in part on the notional index and the policy value account;

determining, by the processor, a first portion of the change in value of the life insurance policy to distribute to the policy value account;

increasing the first value of the policy value account by the first portion;

determining, by the processor, a second portion of the change in value of the life insurance policy to distribute now or in the future to pay for the death benefit; and increasing, by the processor, the first value of the death benefit by an amount based at least in part on the amount of death benefit that could be paid for by the second portion.

* * * * *